(12) United States Patent
Miyasako

(10) Patent No.: US 8,509,481 B2
(45) Date of Patent: Aug. 13, 2013

(54) IMAGE PROCESSING APPARATUS, IMAGE PROCESSING METHOD, IMAGING APPARATUS

(75) Inventor: Kenichi Miyasako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 12/563,770

(22) Filed: Sep. 21, 2009

(65) Prior Publication Data

US 2010/0079624 A1    Apr. 1, 2010

(30) Foreign Application Priority Data

Sep. 26, 2008    (JP) .................. 2008-248070

(51) Int. Cl.
*G06K 9/00*    (2006.01)
(52) U.S. Cl.
USPC .......................................... 382/103; 382/100
(58) Field of Classification Search
None
See application file for complete search history.

(56) References Cited

U.S. PATENT DOCUMENTS

| | | | | |
|---|---|---|---|---|
| 5,699,443 A * | 12/1997 | Murata et al. | .................. | 382/107 |
| 6,597,738 B1 * | 7/2003 | Park et al. | ................. | 375/240.16 |
| 6,766,037 B1 * | 7/2004 | Le et al. | ......................... | 382/107 |
| 6,809,758 B1 * | 10/2004 | Jones | ........................ | 348/208.99 |
| 7,142,600 B1 * | 11/2006 | Schonfeld et al. | ........ | 375/240.16 |
| 7,646,891 B2 * | 1/2010 | Kage et al. | ..................... | 382/107 |
| 7,783,118 B2 * | 8/2010 | Zhou | ............................. | 382/236 |
| 7,899,208 B2 * | 3/2011 | Kondo et al. | ................. | 382/103 |
| 7,956,899 B2 * | 6/2011 | Kurokawa | .................. | 348/208.6 |
| 7,995,852 B2 * | 8/2011 | Nakamaru | ..................... | 382/255 |
| 8,085,848 B2 * | 12/2011 | Kurata | ..................... | 375/240.16 |
| 8,111,877 B2 * | 2/2012 | Watanabe | ..................... | 382/107 |
| 8,116,576 B2 * | 2/2012 | Kondo | .......................... | 382/236 |
| 8,134,613 B2 * | 3/2012 | Kondo et al. | ................. | 348/239 |
| 2002/0118761 A1 * | 8/2002 | Lee | .......................... | 375/240.27 |
| 2004/0061795 A1 * | 4/2004 | Kondo et al. | ................. | 348/239 |
| 2005/0163348 A1 * | 7/2005 | Chen | ............................. | 382/107 |
| 2005/0232514 A1 * | 10/2005 | Chen | ............................. | 382/298 |

(Continued)

FOREIGN PATENT DOCUMENTS

| | | |
|---|---|---|
| JP | 6-133298 A | 5/1994 |
| JP | 11-032325 A | 2/1999 |

(Continued)

OTHER PUBLICATIONS

"Image Registration by the Sequential Similarity Detection Algorithm", Mono Onoe, Norihiko Maeda, Masaru Saito, p. 634, vol. 17, No. 7, Information Processing Society of Japan Jul. 1976.

*Primary Examiner* — Jason M Repko
*Assistant Examiner* — Avinash J Yentrapati
(74) *Attorney, Agent, or Firm* — Canon USA Inc IP Division

(57) ABSTRACT

An image processing apparatus includes a motion vector detecting unit configured to detect, for each field of a signal, a motion vector in each of a plurality of vector detection areas within the field, a determining unit configured to determine, for each field, a group area obtained by grouping the motion vector detection areas based on the motion vector detected by the motion vector detecting unit, a geometric center calculation unit configured to obtain, for each field, a geometric center of the group area, a determination unit configured to determine group areas that correspond to each other in fields that are in consecutive relation in terms of time by comparing the geometric centers of the group areas obtained for each field in consecutive relation.

18 Claims, 14 Drawing Sheets

(56) References Cited

U.S. PATENT DOCUMENTS

| | | | |
|---|---|---|---|
| 2006/0066728 A1* | 3/2006 | Batur | 348/208.99 |
| 2007/0165960 A1* | 7/2007 | Yamada | 382/254 |
| 2008/0107307 A1* | 5/2008 | Altherr | 382/107 |
| 2008/0186386 A1* | 8/2008 | Okada et al. | 348/208.4 |
| 2009/0102935 A1* | 4/2009 | Hung et al. | 348/222.1 |
| 2009/0175496 A1* | 7/2009 | Kondo et al. | 382/103 |
| 2010/0002908 A1* | 1/2010 | Miyamoto et al. | 382/103 |
| 2010/0079606 A1* | 4/2010 | Batur | 348/208.6 |
| 2011/0262011 A1* | 10/2011 | Nair | 382/107 |

FOREIGN PATENT DOCUMENTS

| | | |
|---|---|---|
| JP | 2007-142883 A | 6/2007 |
| JP | 2007-235769 A | 9/2007 |
| JP | 2007-272731 A | 10/2007 |
| JP | 2007-336235 A | 12/2007 |

* cited by examiner

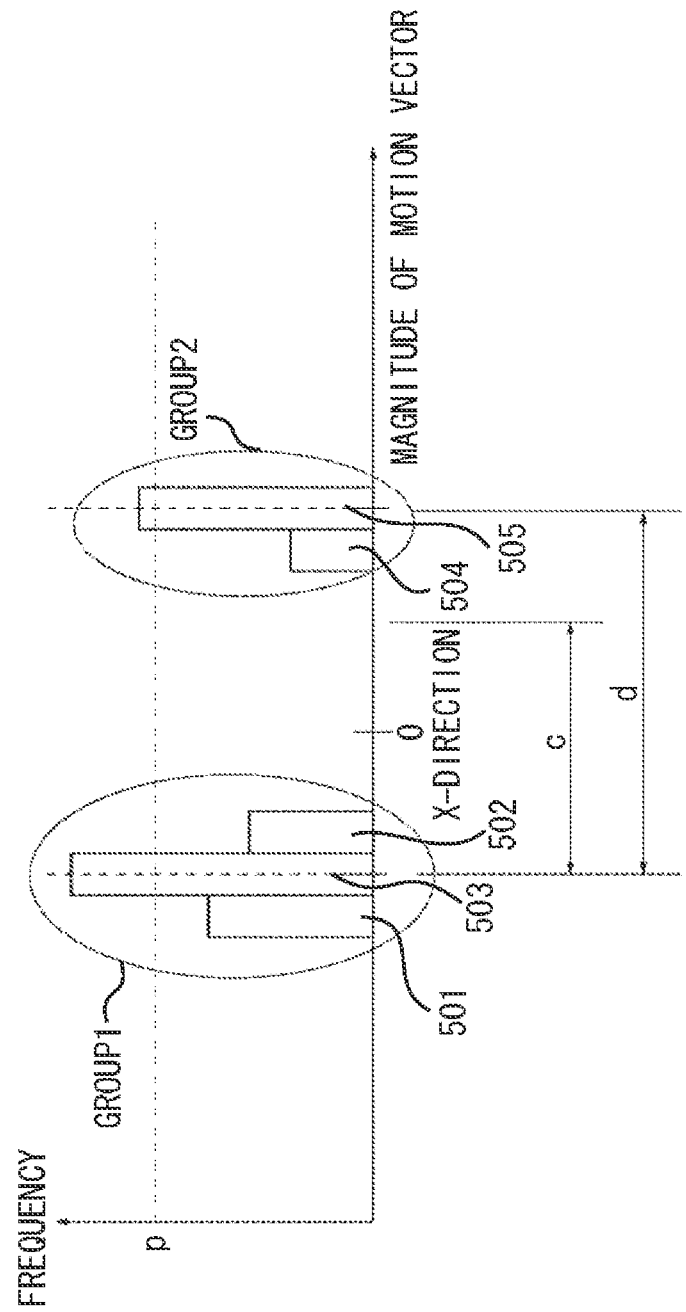

FIG. 6A
| (X0, Y0) | (X1, Y0) | (X2, Y0) | (X3, Y0) | (X4, Y0) | (X5, Y0) | (X6, Y0) | (X7, Y0) |
| (X0, Y1) | (X1, Y1) | (X2, Y1) | (X3, Y1) | (X4, Y1) | (X5, Y1) | (X6, Y1) | (X7, Y1) |
| (X0, Y2) | (X1, Y2) | (X2, Y2) | (X3, Y2) | (X4, Y2) | (X5, Y2) | (X6, Y2) | (X7, Y2) |
| (X0, Y3) | (X1, Y3) | (X2, Y3) | (X3, Y3) | (X4, Y3) | (X5, Y3) | (X6, Y3) | (X7, Y3) |
| (X0, Y4) | (X1, Y4) | (X2, Y4) | (X3, Y4) | (X4, Y4) | (X5, Y4) | (X6, Y4) | (X7, Y4) |
FIG. 6B
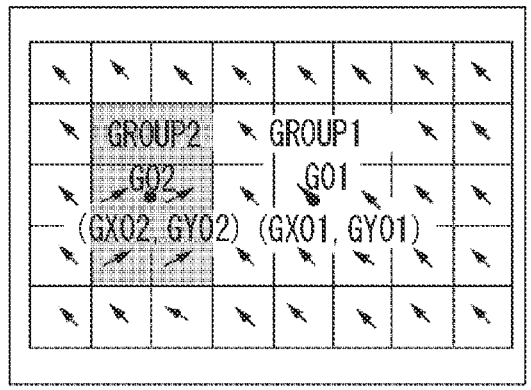
FIG. 6C
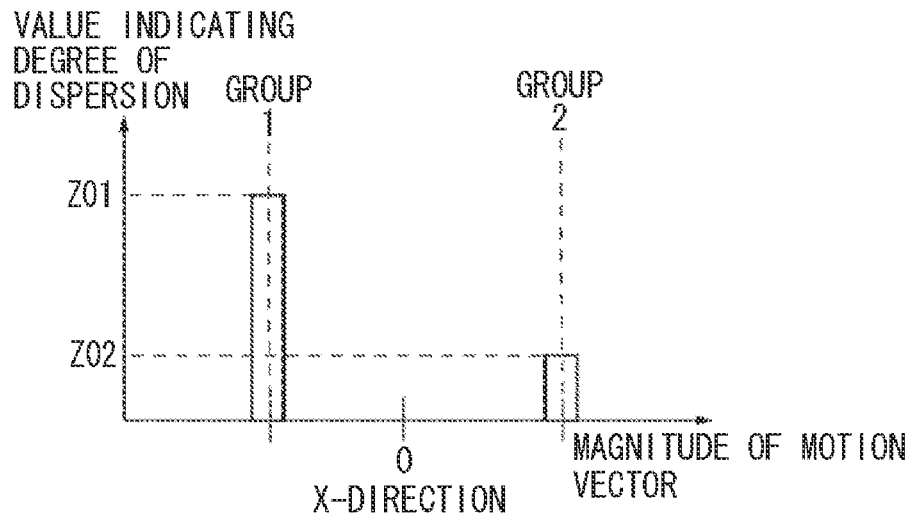

$T = t2 - \Delta t$ $T = t2$

T = t3            T = t3+Δt
FIG. 11A          FIG. 11D
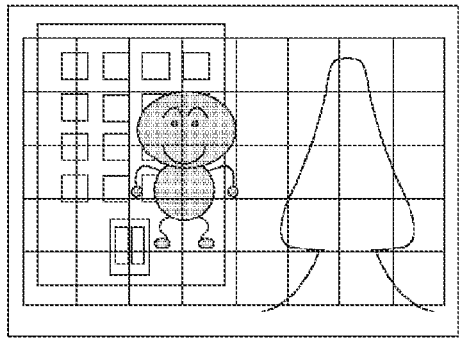 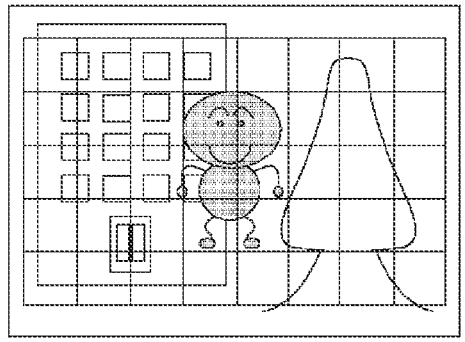
FIG. 11B          FIG. 11E
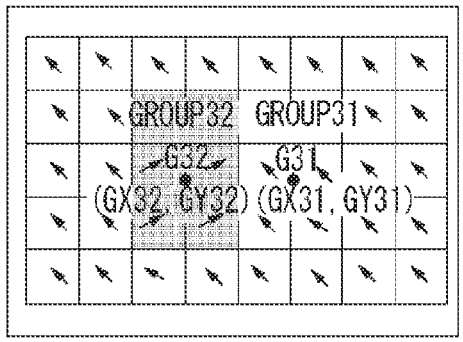 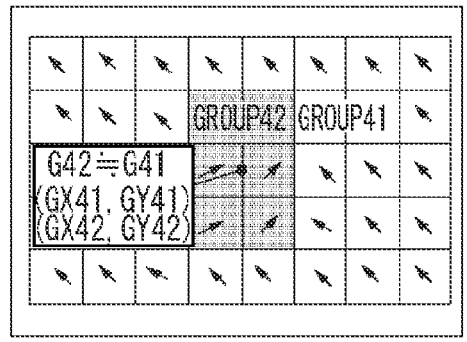
FIG. 11C          FIG. 11F
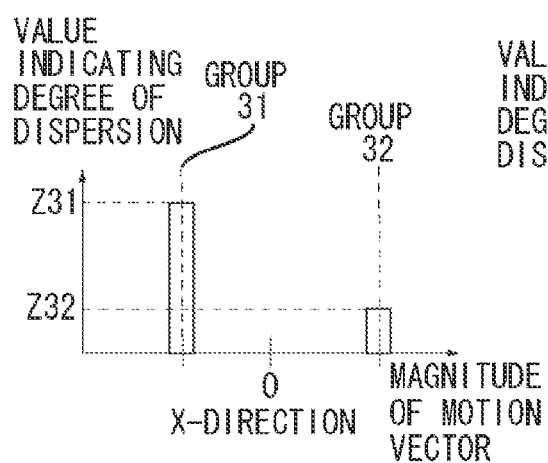 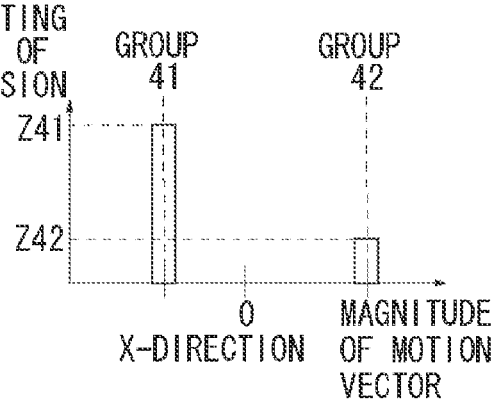

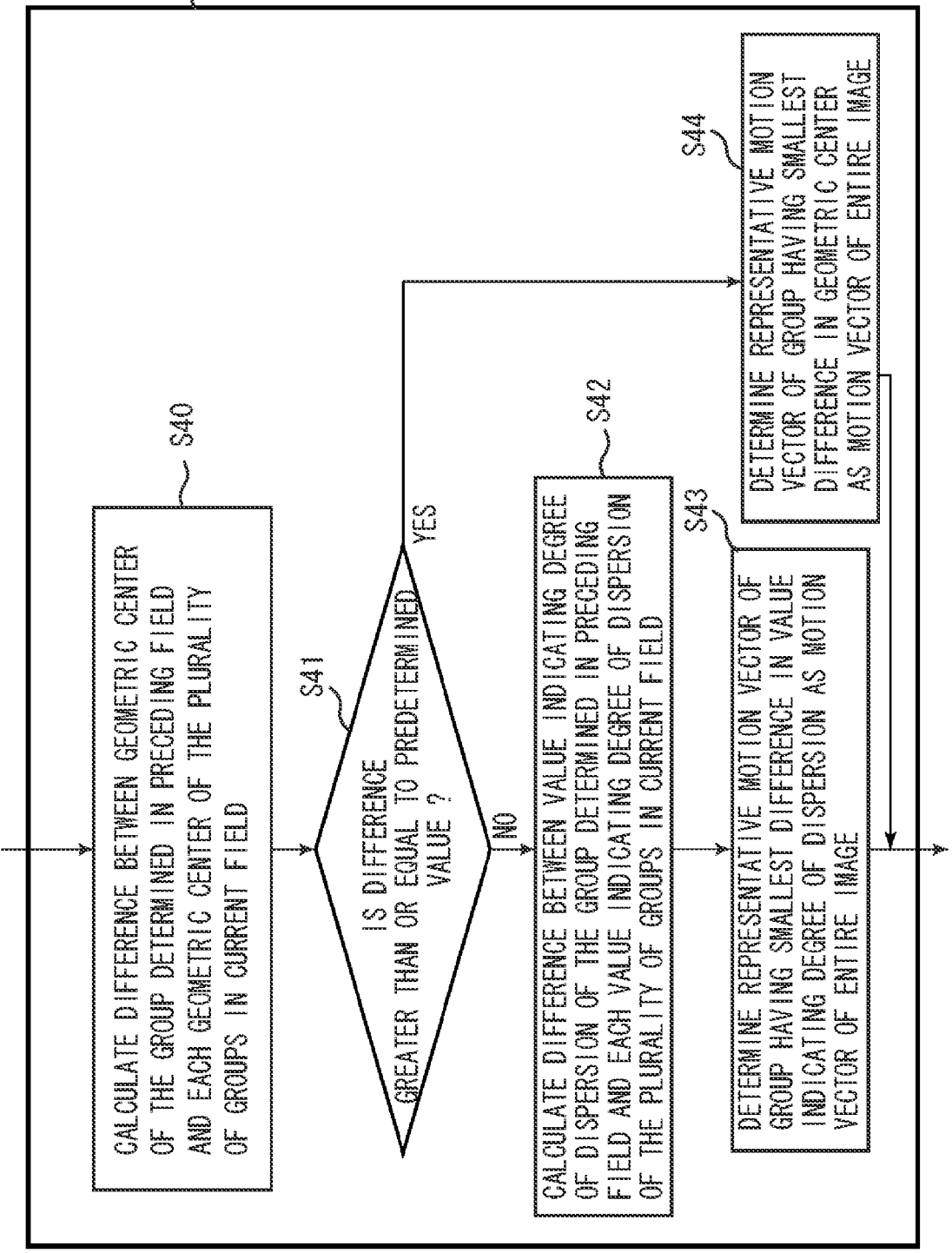

T = t4−Δt                    T = t4
FIG. 13A                     FIG. 13D
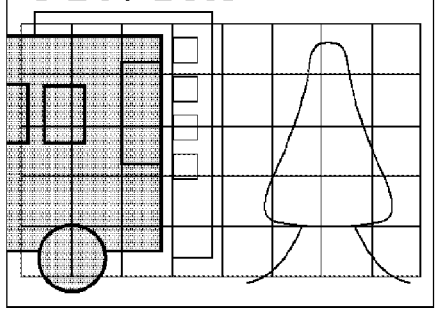         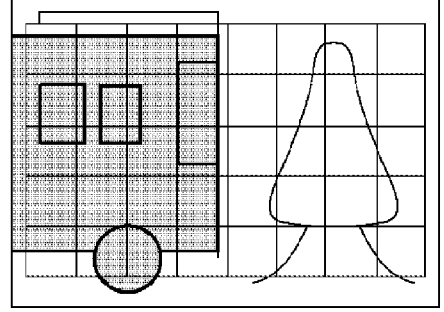
FIG. 13B                     FIG. 13E
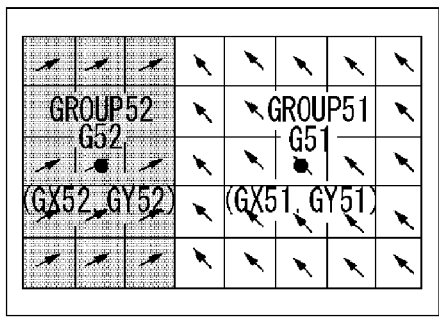         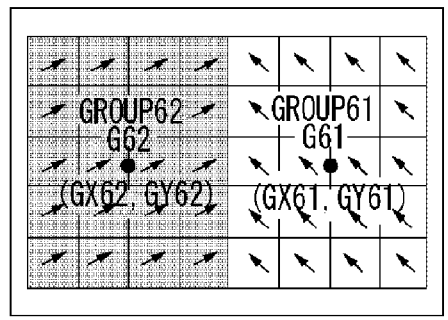
FIG. 13C                     FIG. 13F
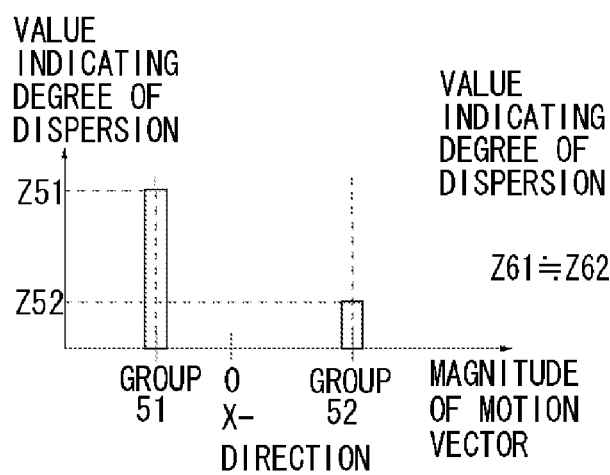         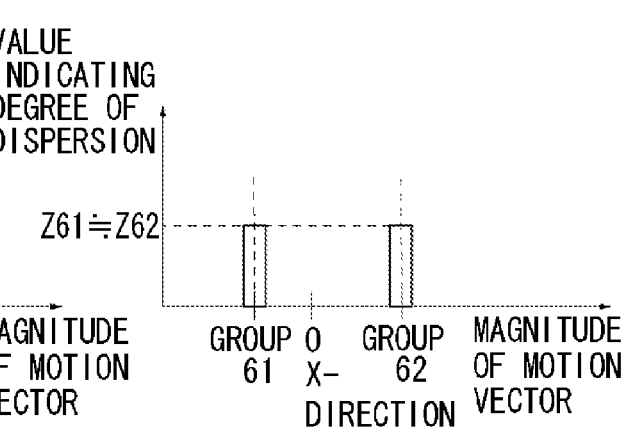

IMAGE PROCESSING APPARATUS, IMAGE PROCESSING METHOD, IMAGING APPARATUS

BACKGROUND OF THE INVENTION

1. Field of the Invention

The present invention relates to an image processing apparatus and an image processing method used for correcting a camera shake to prevent a blur of a moving image captured by a video camera or the like.

2. Description of the Related Art

For users of an imaging apparatus such as a video camera used for capturing a moving image, a blurred image that is generated due to a camera shake, especially when the focus lens is zoomed at a telephoto end is a problem.

To prevent such an image blur due to camera shake, there has conventionally been proposed a technique that detects a motion vector of an image from a captured image signal and corrects the image blur based on the detected motion vector. An imaging apparatus that uses this technique is discussed in Japanese Patent Application Laid-Open No. 06-133298.

Further, a correlation method based on a correlation operation and a block matching method are conventionally used as methods for detecting a motion vector of an image.

According to the block matching, an input image signal is divided into a plurality of blocks (hereinafter referred to as vector detection areas) each having an appropriate area size such as eight pixels×eight lines. A difference between pixels in a predetermined range in a preceding field (or frame) and in the current field is calculated for each vector detection area. A vector detection area of the preceding field (or frame) in which the sum of the absolute value of the difference becomes minimum is searched for. The relative shift between the fields represents the motion vector of the vector detection area.

Matching calculation is discussed in detail by Morio Onoe, et al., in "Information Processing", Vol. 17, No. 7, pp. 634-640, July 1976.

An example of a conventional motion vector detection method using the block matching will now be described referring to FIG. 15. FIG. 15 is a schematic block diagram of an apparatus that prevents a blur using a conventional motion vector detection method.

An image signal (field or frame) subjected to motion vector detection is input to an image memory 101 and a filter 102 used for extracting spatial frequency. The image memory 101 temporarily stores the image signal.

The filter 102 extracts, from the image signal, a spatial frequency component useful for motion vector detection. In other words, the filter 102 removes the low and high spatial frequency components of the image signal.

The image signal that passed through the filter 102 is input to a binarization circuit 103. The binarization circuit 103 binarizes the image signal using zero level as a reference. More specifically, the binarization circuit 103 outputs a sign bit of the output signal.

The binary image signal is input to a correlation calculation circuit 104 and a memory 105 serving as a 1-field period delay unit. The correlation calculation circuit 104 further receives an image signal of a preceding field from the memory 105.

According to the block matching, the image area is divided into a vector detection area of a convenient size, and the correlation calculation circuit 104 calculates the correlation between the temporally continuous image data for each vector detection area. The resultant correlation value is output to a motion vector detection circuit 106.

The motion vector detection circuit 106 detects a motion vector for each vector detection area from the calculated correlation value. More specifically, the motion vector detection circuit 106 searches for a vector detection area of a preceding field having a minimum correlation value. Then, the motion vector detection circuit 106 detects a relative shift between the motion vector detection areas of the current and the preceding fields as a motion vector.

The motion vector of each vector detection area is input to a motion vector determination circuit 107. The motion vector determination circuit 107 determines a representative motion vector, which represents a motion vector of a whole screen, from the motion vector of each of the vector detection areas. More specifically, the motion vector determination circuit 107 determines the median or average of the motion vectors of the vector detection areas as the motion vector of the entire image.

The motion vector determination circuit 107 outputs the motion vector of the entire image to a memory read control circuit 108. The memory read control circuit 108 controls the read position in the image memory 101 so as to cancel image shift in accordance with the motion vector of the entire image. Then, a blurring-corrected image signal is output from the image memory 101.

However, according to the above-described method, if a moving object is included in the image, for example, if an average of the detected motion vectors is determined as the motion vector of the entire image, movement of the moving object in the image will be mixed with the movement of the image.

As a result, the reading position of the image memory changes such that the moving object remains at its original position in the screen. Accordingly, a position in an area in the screen, which does not move under normal circumstances, changes. Thus, the screen appears as though it is drawn by the moving object.

In order to prevent this unnatural motion, it is necessary to control so that the screen only follows the motion vectors of the background and not the areas of the moving object.

Japanese Patent Application Laid-Open No. 2007-235769 discusses a method for preventing a blur when a moving object exists in the screen. According to this method, a vector group that occupies a great number of the detected areas is detected, and the background and the moving object are identified using the vector group.

However, since the method discussed in Japanese Patent Application Laid-Open No. 2007-235769 uses information of a discrete degree of the vector areas in the group for each single frame in determining the area of the moving object, the moving object area determination is not associated in time sequence.

Thus, if the discrete degrees of the background and the moving object are similar, or if the moving object gradually becomes larger, determination error of the area that needs correction of a blurred image due to camera shake or a group that needs to have a blurred image corrected occurs.

SUMMARY OF THE INVENTION

The present invention is directed to an image processing apparatus and a method that can accurately identify a motion vector, which is generated due to shaking of an imaging apparatus, from a motion vector, which is generated due to the movement of the moving object by associating each field (or frame) in time sequence in determining a moving object area so that determination error does not occur during image capturing. More particularly, the present invention is directed to an image processing apparatus and a method that can accurately identify whether a motion vector is generated due to shaking of an imaging apparatus or generated due to the movement of the moving object even if the moving object is large or the moving object gradually becomes larger so that determination error does not occur during image capturing.

According to an aspect of the present invention, an image processing apparatus includes a motion vector detecting unit configured to detect, for each field of a signal, a motion vector in each of a plurality of vector detection areas within the field, a determining unit configured to determine, for each field, a group area obtained by grouping the motion vector detection areas based on the motion vector detected by the motion vector detecting unit, a geometric center calculation unit configured to obtain, for each field, a geometric center of the group area, a determination unit configured to determine group areas that correspond to each other in fields that are in consecutive relation in terms of time by comparing the geometric centers of the group areas obtained for each field in consecutive relation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a detailed histogram of the motion vectors in the case illustrated FIG. 4A.

FIG. 6A illustrates coordinates of the vector detection areas defined according to an embodiment of the present invention.

FIG. 6B illustrates central coordinates of the vector detection areas of groups 1 and 2 in the case illustrated in FIG. 4A.

FIG. 6C illustrates positions of central coordinates and dispersion values of groups 1 and 2, and magnitude of motion vectors and dispersion values in the case illustrated in FIG. 4A.

FIG. 11A illustrates the screen in a state where the moving object is moving at the center of the screen.

FIG. 11B illustrates central coordinates of the vector detection areas of the groups 1 and 2 in the case illustrated in FIG. 11A.

FIG. 11C illustrates positions of central coordinates and dispersion values of groups 1 and 2, and magnitude of motion vectors and dispersion values in the case illustrated in FIG. 11A.

FIG. 11D illustrates a state of the moving object in a current field.

FIG. 11E illustrates central coordinates of the vector detection areas of the groups 1 and 2 in the case illustrated in FIG. 11D.

FIG. 11F illustrates magnitude of the motion vectors and the dispersion values of the groups 1 and 2 in the case illustrated in FIG. 11D.

FIG. 12 is a flowchart illustrating a third method for moving object identification processing in step S15.

FIG. 13A illustrates the screen in a state where a large moving object is moving in the screen.

FIG. 13B illustrates central coordinates of the vector detection areas of the groups 1 and 2 in the case illustrated in FIG. 13A.

FIG. 13C illustrates positions of central coordinates and dispersion values of groups 1 and 2, and magnitude of motion vectors and dispersion values in the case illustrated in FIG. 13A.

FIG. 13D illustrates a state of the moving object in the current field.

FIG. 13E illustrates central coordinates of the vector detection areas of the groups 1 and 2 in the case illustrated in FIG. 13D.

FIG. 13F illustrates magnitude of the motion vectors and dispersion values of the groups 1 and 2 in the case illustrated in FIG. 13D.

DETAILED DESCRIPTION OF THE EMBODIMENTS

Various exemplary embodiments, features, and aspects of the invention will be described in detail below with reference to the drawings.

Figure 1:
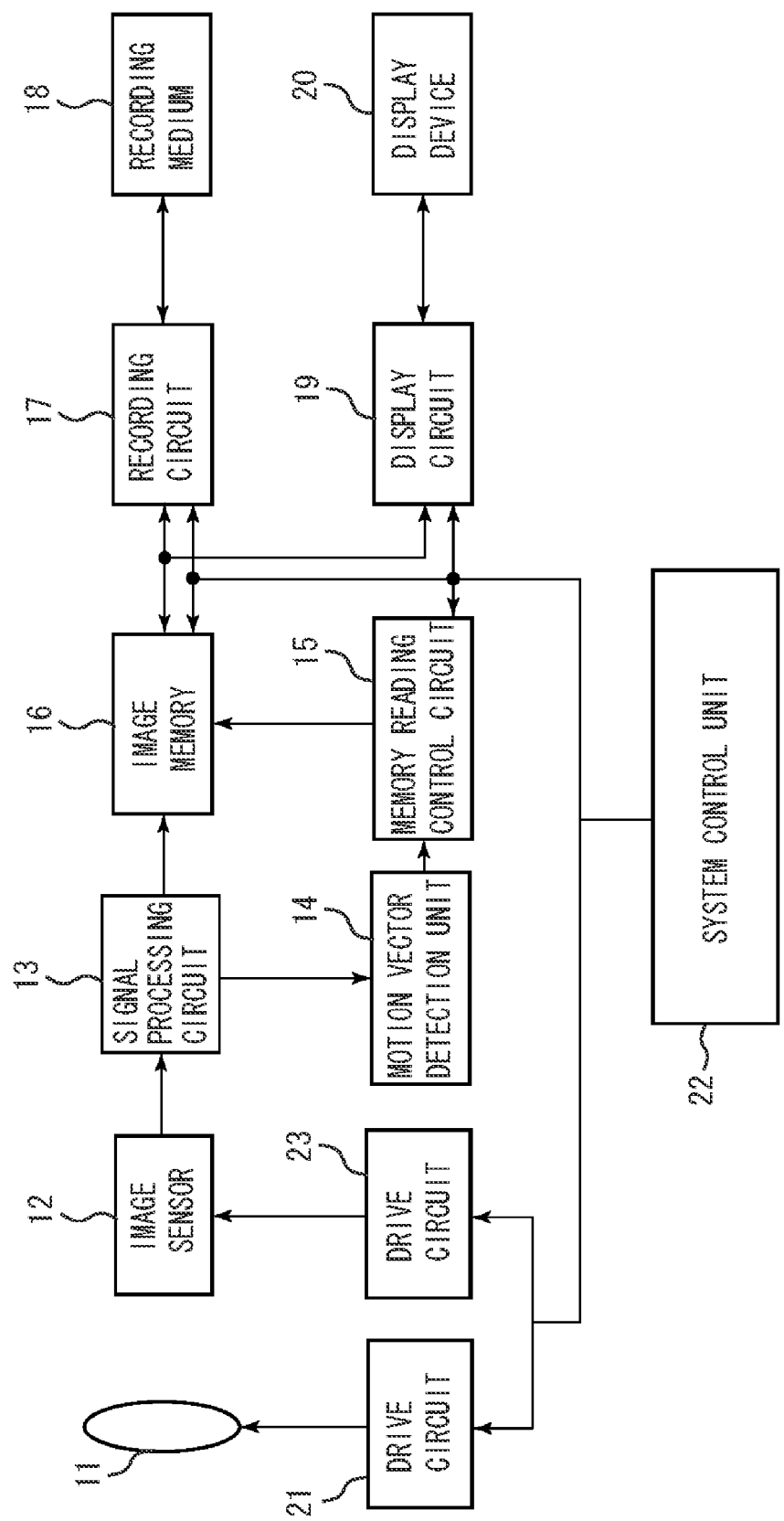
FIG. 1 is a block diagram illustrating a configuration of a video camera or a camera as an imaging apparatus including a motion vector detection device according to an exemplary embodiment of the present invention.

FIG. 1 is a block diagram illustrating a configuration of a video camera or a camera as an imaging apparatus including an image processing apparatus according to an exemplary embodiment of the present invention. The present invention can be applied to any video cameras employing interlace scan or progressive scan. In the following exemplary embodiments, image data obtained by a video camera during vertical synchronization period will be described as field image data. However, it is not limited to this. In other words, the term "field" can be replaced by the term "frame" in the following exemplary embodiments.

In FIG. 1, an imaging optical system 11 includes a lens and a diaphragm. An image sensor 12 includes a charge-coupled device (CCD) or a complementary metal oxide semiconductor (CMOS) sensor. A drive circuit 21 drives components such as a zoom lens, a focus lens, and a diaphragm (not illustrated) included in the imaging optical system 11. A drive circuit 23 drives an image sensor 12.

A signal processing circuit 13 processes captured image data. A motion vector detection unit 14 detects a motion vector from the image data processed by the signal processing circuit 13.

A memory read control circuit 15 controls determination of a range of image data to be recorded or displayed based on the motion vector detected by the motion vector detection unit 14. An image memory 16 is used for storing the signal-processed image data.

A recording medium 18 is a recording medium such as a memory card or a hard disk. A recording circuit 17 is used for recording the signal-processed image data in the recording medium 18. A display device 20 displays the signal-processed image data. A display circuit 19 is used for displaying an image on the display device 20. A system control unit 22 controls the entire video camera.

Imaging operation of the video camera having the above-described configuration will be described below.

First, the drive circuit 21 drives the zoom lens, the focus lens, and the diaphragm in the imaging optical system 11 based on a control signal output from the system control unit 22 so that an object image is formed on the image sensor 12.

The image sensor 12 is driven by a drive pulse that is generated by the drive circuit 21 controlled by the system control unit 22. The image sensor 12 photoelectrically converts the object image into an electric signal, and outputs an analog image signal. The analog image signal output from the image sensor 12 is converted into a digital image signal by an A/D converter (not illustrated) included in the signal processing circuit 13.

The signal processing circuit 13, which is controlled by the system control unit 22, performs image processing on the digital image such as color conversion, white balance correction, and gamma correction as well as resolution conversion and image compression. The image memory 16 temporary stores the digital image signal during the signal processing and also stores the signal-processed digital image signal as the image data.

The motion vector detection unit 14 as the image processing apparatus of the present invention detects a motion vector from the image data, which is processed by the signal processing circuit 13. Details of the detection processes are described below.

The memory read control circuit 15 controls determination of a range of the image data to be recorded or displayed based on the motion vector information detected by the motion vector detection unit 14 so that image blur is prevented.

The image data processed by the signal processing circuit 13 and the image data stored in the image memory 16 is converted by the recording circuit 17 into data (e.g., file system data having a hierarchical structure) that is appropriate for recording in the recording medium 18, and then the data is recorded in the recording medium 18.

Further, after the resolution conversion processing is performed by the signal processing circuit 13, the image data is converted into a signal (e.g., analog signal in NTSC format) that is appropriate for display on the display device 20 by the display circuit 19, and then an image is displayed on the display device 20.

Figure 2:
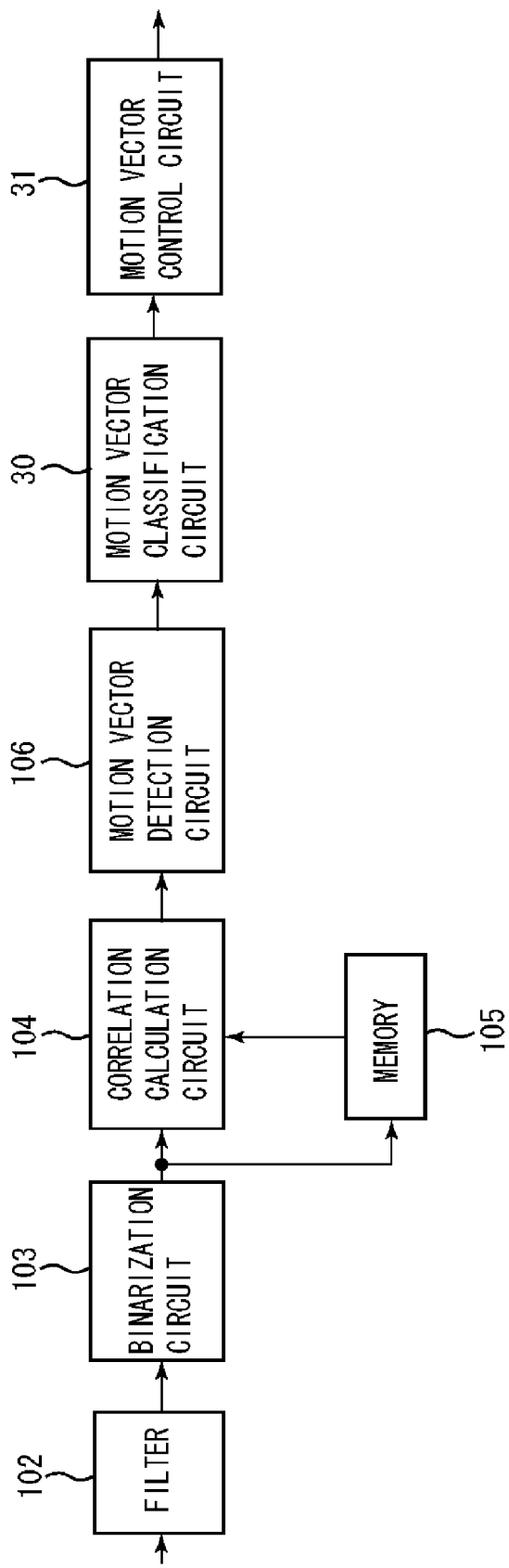
FIG. 2 is a block diagram illustrating a configuration of the motion vector detection device according to an exemplary embodiment of the present invention.

FIG. 2 is a block diagram illustrating a configuration of the motion vector detection unit 14. Components, which are in common with those in FIG. 18, are given the same alphanumeric characters as those in FIG. 18 and detailed descriptions are omitted.

Unlike the motion vector detection unit 14 illustrated in FIG. 18, the motion vector detection unit 14 in FIG. 2 includes a motion vector classification circuit 30 and a motion vector control circuit 31 subsequent to a motion vector detection circuit 106, which detects a motion vector of each vector detection area.

Figure 3A:
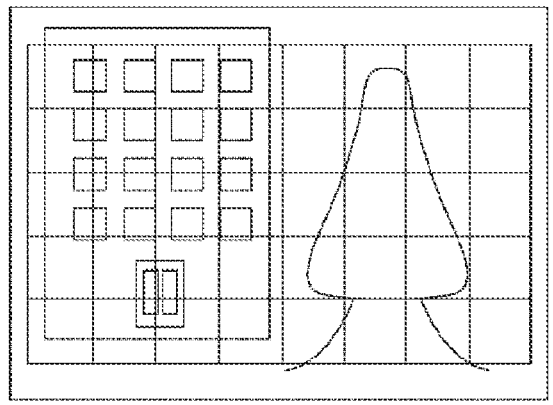
FIG. 3A illustrates an example of a vector detection area that is used for motion vector detection on a screen of a current field of a captured image.
Figure 3B:
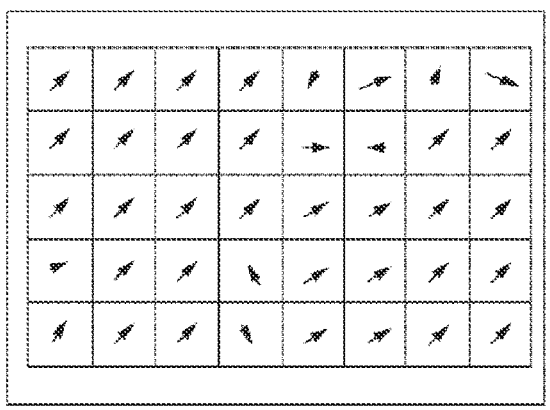
FIG. 3B illustrates a motion vector that is obtained according to a difference between a preceding field and a current field.
Figure 3C:
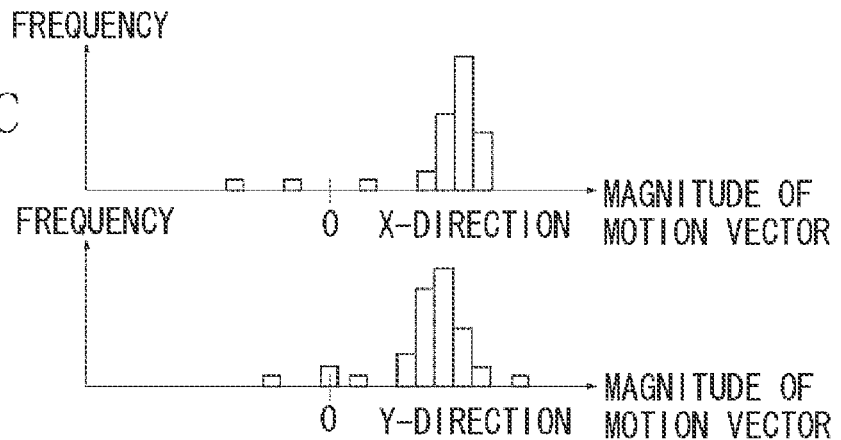
FIG. 3C is a histogram illustrating frequency of each magnitude, in X-direction and Y-direction, of the motion vector in all vector detection areas.

Operation of the motion vector classification circuit 30 is described below. FIG. 3A illustrates a screen displaying an example of the vector detection area from which the motion vector is detected. The vector detection area in FIG. 3A is taken from a current field of the captured image. FIG. 3B illustrates motion vectors that are obtained using a difference between the current field and a field that immediately precedes the current field. FIG. 3C is a histogram (frequency distribution) of each frequency of magnitude of the motion vectors in the whole vector detection areas in the X direction (horizontal direction in the screen) and the Y direction (vertical direction in the screen).

The motion vector classification circuit 30 generates histogram data (hereinafter, histogram data is simply referred to as histogram). In other words, the motion vector classification circuit 30 classifies the motion vectors by setting the horizontal axis of the frequency distribution as a magnitude of the motion vector, and dividing the distribution into predetermined magnitudes (ranges). Then, the class of the detected motion vector of each vector detection area is determined according to its magnitude, and the frequency of the motion vectors is plotted.

According to the example in FIG. 3B, a total of forty motion vectors are detected from the vector detection areas. Thus, the frequency of each class is obtained by classifying the forty motion vectors into corresponding classes and plotting them.

Median of an upper limit and a lower limit of a class can be used as a class value of each of the classes having a certain range.

Figure 4A:
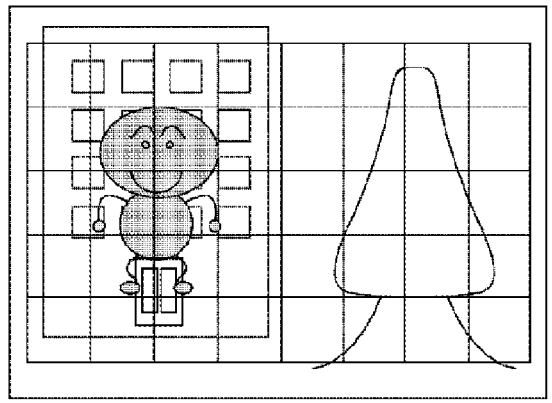
FIG. 4A illustrates a screen when a moving object enters into the screen.
Figure 4B:
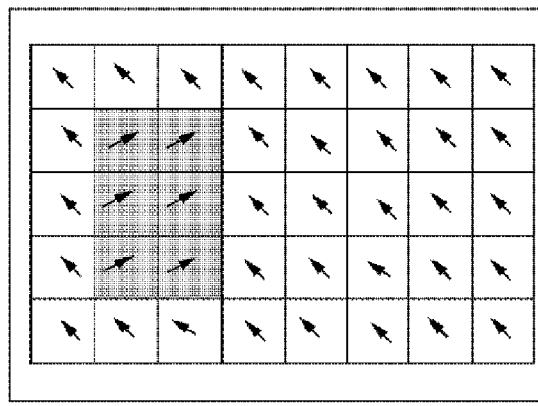
FIG. 4B illustrates a distribution of the motion vectors in the case illustrated FIG. 4A.
Figure 4C:
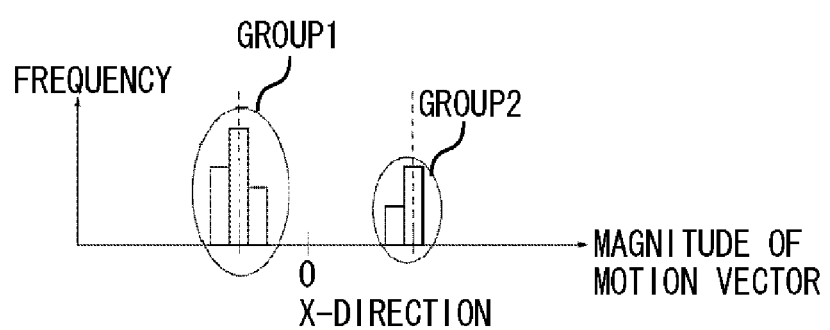
FIG. 4C is a histogram of the motion vectors in the case illustrated FIG. 4A.

FIGS. 4A to 4C illustrate a captured image of the current field, motion vectors of the captured image, and a histogram. FIG. 4A illustrates an object that is moving at time t1.

As illustrated in FIG. 4B, if the object is moving, the motion vectors in the area of the moving object that is obtained by taking the difference between the preceding field and the current field will be different from the motion vectors in other areas. The histogram of the frequency of the magnitude of the motion vectors in the X direction in this case is illustrated in FIG. 4C. As can be seen from FIG. 4C, there are two peaks that can be grouped into groups 1 and 2.

From FIG. 4A, it is understood that the group 2 represents the motion vectors in the areas of the moving object and the group 1 represents the motion vectors in other areas.

However, at this stage, two groups are only detected. It is not clear from the histogram in FIG. 4C which of the groups represents the motion vectors of the camera shake and which represents the motion vectors of the movement of the object superposed over the camera shake. The determination process will be described below.

FIG. 5 is an example of a histogram illustrating frequency of the magnitude of the motion vector in the X direction of the vector detection area taken from the captured image in the current field.

First, classification of the detected motion vectors into groups will be described. First, an extreme value (peak) of the frequency distribution such as plot 503 or 505 in FIG. 5 is searched. The extreme value is a value that exceeds a predetermined frequency "p".

If a plurality of extreme values are found, whether the distance between the extreme values exceeds a predetermined distance "c" is determined. If the distance between the peak values exceeds the distance "c", the peak values are determined to be in different groups. If the distance does not exceed the distance "c", the peak values are determined to be in the same group.

A class having the greatest frequency in the group is regarded as a representative class of the group, and the class value of the representative class is determined as a representative class value. The distance "c" is set so that it is greater than a motion vector detection error.

In the case in FIG. 5, the extreme values are indicated by the plots 503 and 505, and these plots exceed the frequency "p". Further, since the distance between the extreme values in this case is "d", which is greater than the distance "c", the two groups are determined as different.

On the other hand, a plot 502, which is adjacent to the plot 503 having the extreme value, exceeds the frequency "p" but the distance between the classes does not exceed the distance "c". Thus, the plots 502 and 503 are determined to be in the same group. Additionally, a plot 501, which is adjacent to the plots 502 and 503 and does not exceed the frequency "p", is determined to be in the same group as the plot 503.

Similarly, a plot 504, which is adjacent to the plot 505, is determined to be in the same group as the plot 505. In this way, the motion vectors that are detected from the vector detection areas are classified into one or more groups. Since each of such groups has a representative class value, a representative motion vector of the group can be obtained.

The process of classifying the motion vectors into group areas is performed by the motion vector classification circuit 30.

According to the above-described processing with reference to FIG. 4A, the group 2 in FIG. 4C is determined to represent a group of motion vectors in the areas of the moving object and the group 1 in FIG. 4C is determined to represent a group of motion vectors in other areas.

Next, referring to FIGS. 6A to 6C and the flowchart illustrated in FIG. 7, operation of the motion vector control circuit 31 will be described.

Figure 7:
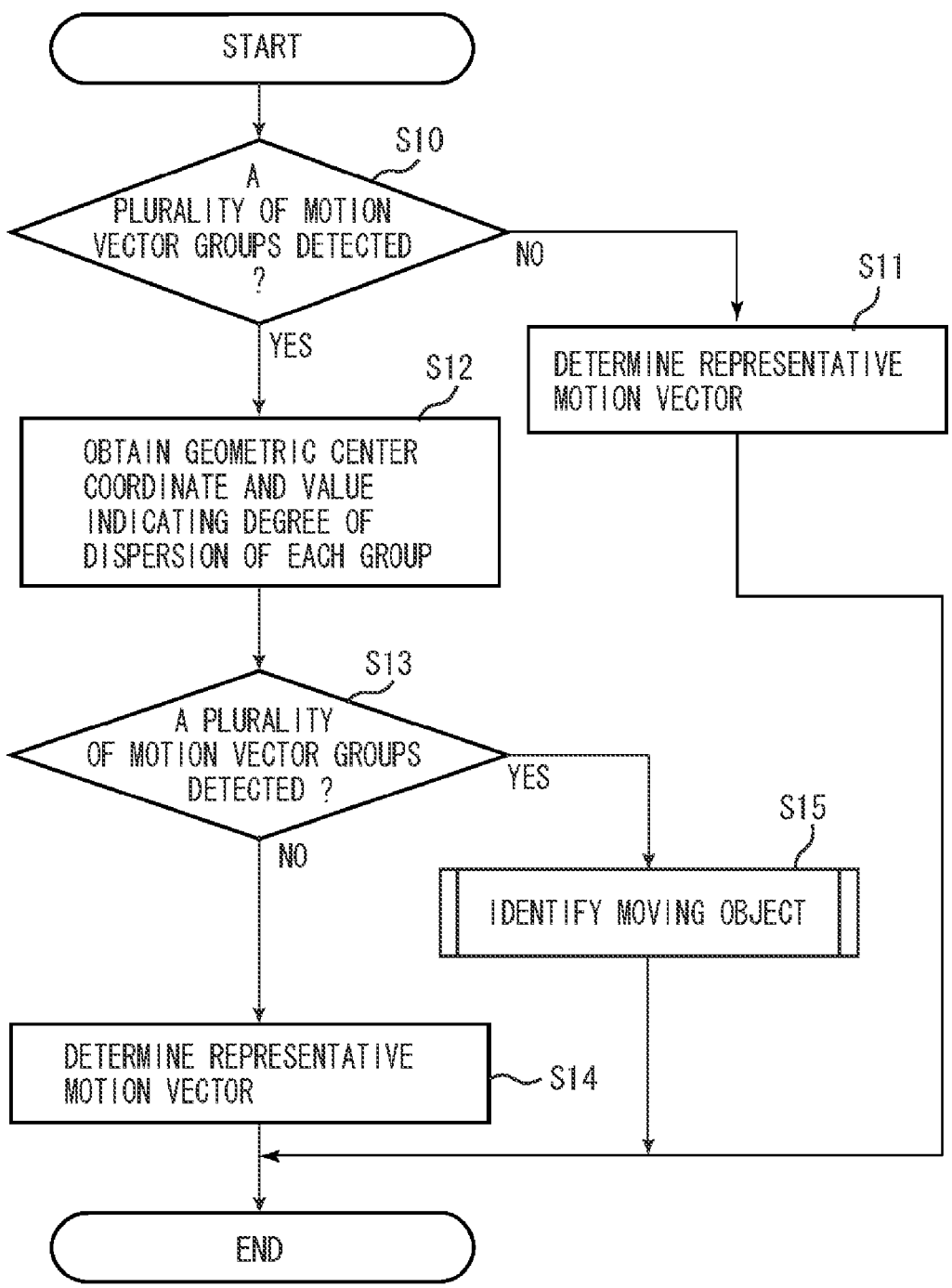
FIG. 7 is a flowchart used for determining the moving object.

In step S10 in FIG. 7, the motion vector control circuit 31 determines whether the motion vector classification circuit 30 has detected a plurality of motion vector groups in the current field (current image data). If only one group is detected (NO in step S10), then the process proceeds to step S11. If a plurality of groups are detected (YES in step S10), then the process proceeds to step S12.

In step S11, determination of the motion vector is performed. Since the number of the motion vector groups detected in Step S10 is one, the representative motion vector of the detected group is determined as the motion vector of the entire screen (whole image data).

In step S12, since a plurality of motion vector groups are detected in step S10, geometric center of the vector detection areas in each group and a value indicating a degree of dispersion of the vector detection areas are calculated.

Now, the process in step S12 will be described referring to FIG. 6. This description is based on FIGS. 4A to 4C where a plurality of motion vector groups are set in the screen.

First, as illustrated in FIG. 6A, the geometric center of each vector detection area in the screen are defined.

FIG. 6B illustrates the geometric centers of the group areas. Before obtaining the geometric centers of the group areas, the histogram illustrated in FIG. 4C is generated based on the motion vectors detected in the screen in FIG. 4A, and the motion vectors are classified into groups.

FIG. 6C is a graph illustrating a relation between the magnitude of the representative motion vector in the X direction and the value indicating degree of dispersion of the vector detection areas.

The geometric center of the vector detection area in group 1 in FIG. 4C is defined as G01 (GX01, GY01) and the value indicating the degree of dispersion of the vector detection areas in the group 1 in FIG. 4C is defined as Z01.

On the other hand, the geometric center of the vector detection area of group 2 in FIG. 4C are defined as G02 (GX02, GY02) and the value indicating the degree of dispersion of the vector detection areas in the group 2 in FIG. 4C is defined as Z02.

The geometric center coordinates of the vector detection areas in the group 2 according to FIG. 6A are the following six coordinates:

(X1, Y1), (X1, Y2), (X1, Y3), (X2, Y1), (X2, Y2), (X2, Y3)

Calculating formulae used for obtaining G02=(GX02, GY02) and Z02 are formulae (1), (2), and (3) given below. The geometric center coordinates G01=(GX01, GY01) and the value Z01 that indicates the degree of dispersion of the vector detection areas in the group 2 can be obtained in a similar manner.

$$GX02=(X1+X1+X1+X2+X2+X2)/6 \quad (1)$$

$$GY02=(Y1+Y2+Y3+Y1+Y2+Y3)/6 \quad (2)$$

$$Z02=[\{(X1-GX02)^2+(Y1-GY02)^2\}+\{(X1-GX02)^2+(Y2-GY02)^2\}+\{(X1-GX02)^2+(Y3-GY02)^2\}+\{(X2-GX02)^2+(Y1-GY02)^2\}+\{(X2-GX02)^2+(Y2-GY02)^2\}+\{(X2-GX02)^2+(Y3-GY02)^2\}]/6 \quad (3)$$

FIG. 6B illustrates central coordinates of the groups 1 and 2 in FIG. 4C. Further, FIG. 6C illustrates a histogram of magnitude of the motion vectors in the groups 1 and 2 in FIG. 4C and values indicating the degree of dispersion of the vector detection areas.

Now, returning to the flowchart in FIG. 7, in step S13, the motion vector control circuit 31 determines whether a plurality of motion vector groups are detected in the preceding field (image data of the past). If a plurality of motion vector groups are not detected in the preceding field (NO in step S13), then the process proceeds to step S14. If a plurality of motion vector groups are detected in the preceding field (YES in step S13), then the process proceeds to step S15.

In step S14, the motion vector classification circuit 30 determines one group as a reference group. If the process has proceeded to step S14, a plurality of motion vector groups are not detected in the preceding field in step S13. Thus, it is assumed that a moving object has entered the screen area, or an object in the area started to move from a static condition, or if not, a relative speed of the preceding field and the camera shake happened to be the same.

According to the present exemplary embodiment, out of the above-described plurality of motion vector groups in the current field, the group having a greatest value that indicates the degree of dispersion of the vector detection areas obtained in step S12 is determined to be the group that does not include a moving object. In other words, the group is determined to be the group of the background areas.

Then, a representative motion vector of that group is determined as a motion vector of the entire screen (whole image data).

According to the present exemplary embodiment, the group having the greatest value that indicates the degree of dispersion of the vector detection areas is determined as the group of the background area since, in most cases, the background area is larger than the object area.

Additionally, since the user generally sets the object at the center when capturing an image, even if the size of the object is considerably large, the value indicating the degree of dispersion of the vector detection areas in the background area becomes larger.

When the current field (current image data) is in a state illustrated in FIG. 6B, the value indicating the degree of dispersion of the vector detection areas in the group 1 is defined as Z01 and the value indicating the degree of dispersion of the vector detection areas in the group 2 is defined as Z02. The relation between the magnitudes of the motion vectors and the values indicating the degree of dispersion of the vector detection areas is illustrated in FIG. 6C.

In FIG. 6C, since Z01 is greater than Z02, the representative motion vector of the group 1 being the group having a larger value indicating the degree of dispersion of the vector detection areas is determined as the motion vector of the entire screen (whole image data).

According to the present exemplary embodiment, the representative motion vector of the group 1, being the group having a larger value indicating the degree of dispersion of the vector detection areas, is determined as the motion vector of the entire screen (whole image data).

However, the determination method in step S14 is not limited to the above-described method, and a different method can be used so long as the representative motion vector of one group is determined out of a plurality of groups. For example, the representative motion vector of the group 2, being the group having a smaller value indicating the degree of dispersion of the vector detection areas, can be determined as the motion vector of the moving object.

In step S15, the motion vector control circuit 31 performs moving object identification processing. If the process has proceeded to step S15, a plurality of motion vector groups are detected in the preceding field in step S13, which also means that the moving object is moving in the screen.

A first method used for the moving object identification processing in step S15 will now be described referring to FIGS. 8A to 8F and a flowchart illustrated in FIG. 9.

Figure 9:
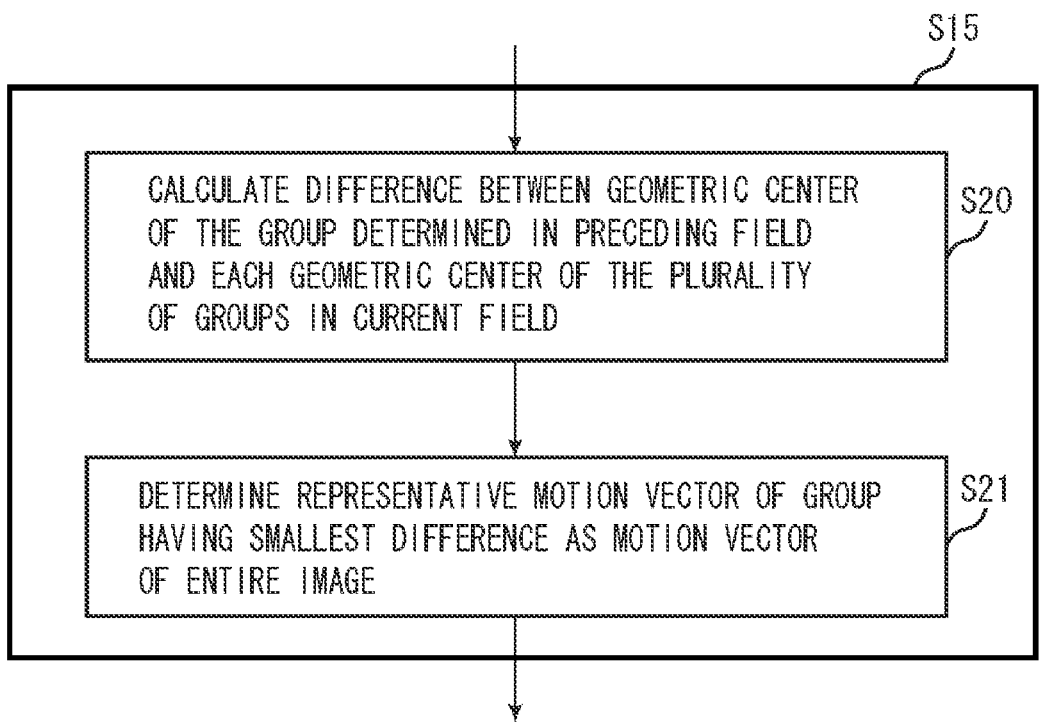
FIG. 9 is a flowchart illustrating a first method for moving object identification processing in step S15 in FIG. 7.

In step S20 in FIG. 9, the group area that is determined as the representative motion vector group area in the preceding field and the plurality of the motion vector group areas in the current field are compared to determine whether they correspond to each other.

More particularly, a difference between geometric center coordinates of the representative motion vector group in the preceding field and each of geometric center coordinates of the plurality of the motion vector groups in the current field is calculated.

In step S21, the group in the current field having the smallest difference in the geometric center coordinates with respect to the geometric center coordinates of the representative motion vector group in the preceding field is determined to be the representative motion vector group in the current field. Then, the representative motion vector group in the preceding field and the group determined in step S21 are determined to be in the same group. Processes in steps S20 and S21 will be described below in detail.

Figure 8A:
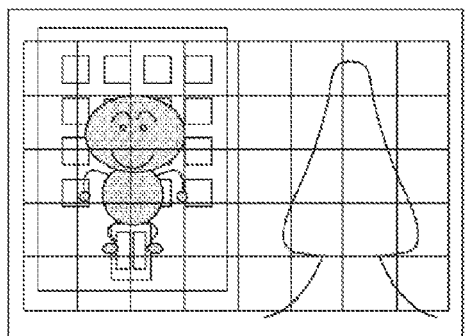
FIG. 8A illustrates a state of the moving object in a preceding field.
Figure 8D:
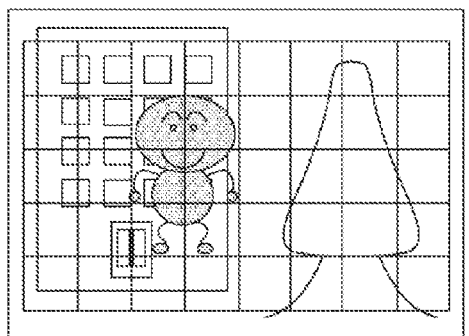
FIG. 8D illustrates a state of the moving object in the current field.
Figure 8B:
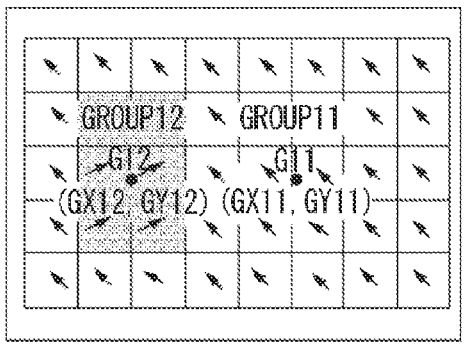
FIG. 8B illustrates central coordinates of the vector detection areas of the groups 1 and 2 in the case illustrated in FIG. 8A.
Figure 8E:
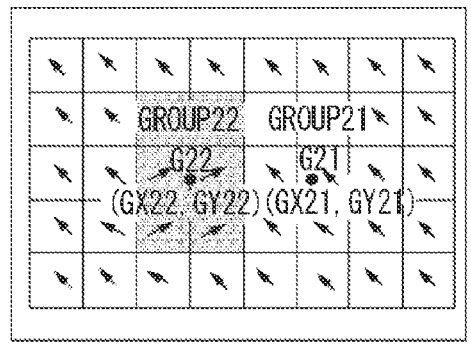
FIG. 8E illustrates central coordinates of the vector detection areas of the groups 1 and 2 in the case illustrated in FIG. 8D.

According to the present exemplary embodiment, the screen of the preceding field at time (t2−Δt) is illustrated in FIG. 8A. After Δt second, the screen is changed to that illustrated in FIG. 8D (current field at time t2). The geometric center coordinates of each motion vector group in the preceding field are as illustrated in FIG. 8B. Further, the geometric center coordinates of each motion vector group in the current field are as illustrated in FIG. 8E.

Figure 8C:
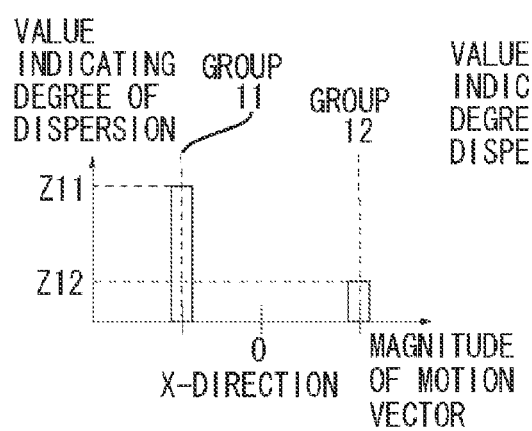
FIG. 8C illustrates magnitude of the motion vectors and the dispersion values of the groups 1 and 2 in the case illustrated in FIG. 8A.
Figure 8F:
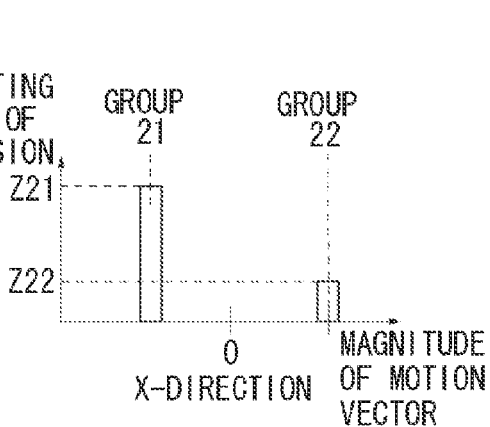
FIG. 8F illustrates magnitude of the motion vectors and dispersion values of the groups 1 and 2 in the case illustrated in FIG. 8D.

A relation between the magnitudes of the motion vectors of the motion vector groups in the preceding field and values indicating the degree of dispersion is as illustrated in FIG. 8C. Further, a relation between the magnitudes of the motion vectors of the motion vector groups in the current field and values indicating the degree of dispersion is as illustrated in FIG. 8F.

According to the processing in step S14, one group out of a plurality of groups in the preceding field is determined as the representative motion vector group (reference group). According to the present exemplary embodiment, a representative motion vector of a group having a greater value indicating the degree of dispersion with respect to the motion vectors in the vector detection areas obtained in step S12 is determined as the motion vector of the entire screen (whole image data). According to the present exemplary embodiment, since Z11 is greater than Z12 as illustrated in FIG. 8C, the group 1 in FIG. 8B is determined as the representative motion vector of the preceding field.

In step S20, the group area that is determined as the representative motion vector group in the preceding field and the plurality of the motion vector group areas in the current field are compared to determine whether they correspond to each other.

More specifically, the geometric center coordinates of the group that does not include a moving object in the preceding field and the geometric center of each of the plurality of groups detected in the current field are compared.

The geometric centers are compared by using a difference between the geometric center coordinates. A difference between geometric center coordinates G11=(GX11, GY11) of a group 11 that is detected in the preceding field and geometric center coordinates G21=(GX21, GY21) of a group 21 that is detected in the current field is defined as ΔG[21].

Further, a difference between the geometric center coordinates G11=(GX11, GY11) of the group 11 that is detected in the preceding field and geometric center coordinates G22=(GX22, GY22) of a group 22 that is detected in the current field is defined as ΔG[22].

Calculating formulae for obtaining ΔG[21] and ΔG[22] are the following formulae (4) and (5).

$$\Delta G[21]=|G11-G21|=\{(GX11-GX21)^2+(GY11-GY21)^2\}^{1/2} \quad (4)$$

$$\Delta G[22]=|G11-G22|=\{(GX11-GX22)^2+(GY11-GY22)^2\}^{1/2} \quad (5)$$

In NTSC format, since the time between the fields is only 1/60 second, the geometric center coordinates are not likely to change greatly between the preceding and the current fields.

Thus, out of a plurality of groups in the current field, a group having a geometric center coordinates that are closer to the geometric center coordinates of the group in the area that does not include a moving object in the preceding field, is not likely to include the moving object.

Thus, a group in the current field having the smallest difference, when a difference between the geometric center coordinates of the group having the representative motion vector in the preceding field and the geometric center coordinates of a plurality of groups in the current field are compared, is determined as the group having the motion vector of the entire screen.

In this way, the vector detection area that does not include the moving object can be determined more reliably.

As can be seen from FIGS. 8C and 8F, and formulae (4) and (5), in step S21, ΔG[21] is smaller than ΔG[22]. Thus, the group 21 is determined as the group that does not include the moving object in the current field, and further the group 11 is determined as the group that does not include the moving object in the preceding field.

A similar effect can be obtained according to processes other than those performed in steps S20 and S21.

For example, the geometric center coordinates of the group that is not determined as the representative motion vector group in the preceding field and the geometric center coordinates of each of the plurality of groups in the current field are compared to determine a group in the current field having the smallest difference with the group in the preceding field. Then the determined group in the current field is excluded from the groups to be determined as the motion vector of the entire screen. Then, the representative motion vector of the remaining groups may be determined as the motion vector of the entire screen. In this way, a similar effect can be obtained.

Further, according to processes insteps S20 and S21, the group having a smaller value indicating the degree of dispersion of the vector detection area obtained in step S12 can be determined as the group including the moving object.

For example, the geometric center coordinates of the group that is not determined as the representative motion vector group in the preceding field and the geometric center coordinates of each of the plurality of groups in the current field are compared to determine a group in the current field having the smallest difference with the group in the preceding field. Then the determined group in the current field is determined as the group including the moving object.

When a difference between the geometric center coordinates of the group determined as the representative motion vector in the preceding field and the geometric center coordinates of a plurality of motion vector groups in the current field are compared, a group in the current field having the smallest difference is determined as the group corresponding to the group that is determined as a representative motion vector in the preceding field. Thereby, correspondence between a group determined in the preceding field and a group in the current field is determined. Therefore, the areas located in different fields can be related with each other through time sequence. As a result, even when a moving object is becoming larger gradually, the possibility for determining the area erroneously can be reduced. By using an imaging apparatus that includes the motion vector detection device according to the present exemplary embodiment and by applying camera shake correction to the group that is determined as the group that does not include the moving object, the screen is not drawn by the moving object.

Further, by applying the camera shake correction to the group that is determined as the group including the moving object, tracking of the moving object becomes possible.

Figure 10:
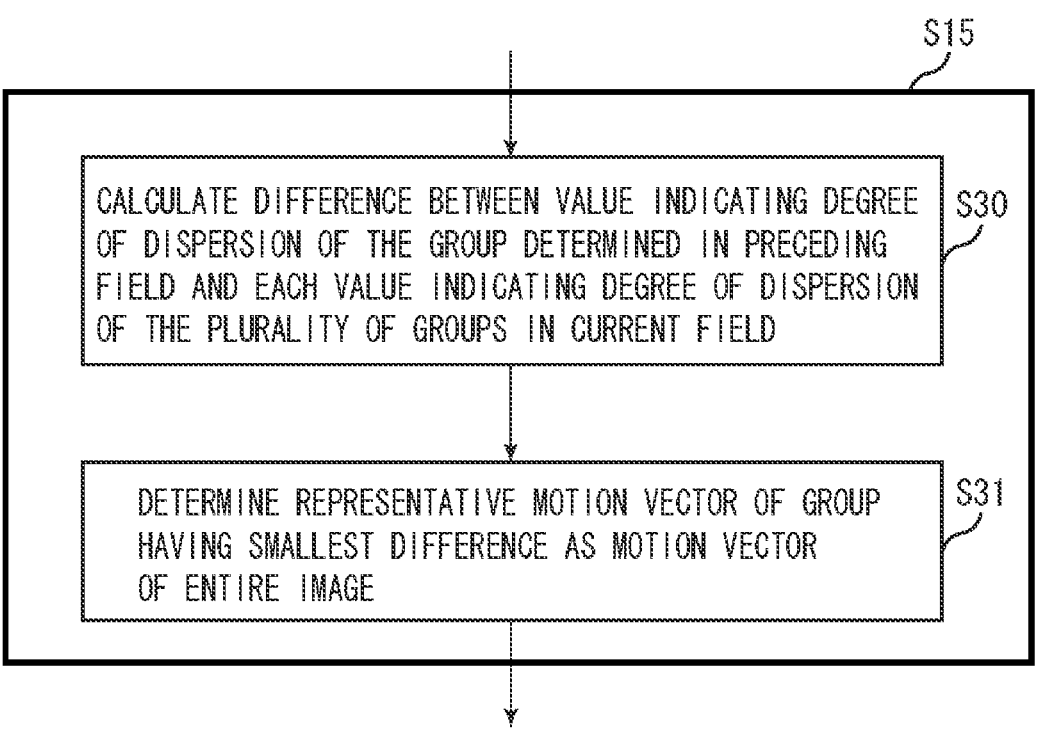
FIG. 10 is a flowchart illustrating a second method for moving object identification processing in step S15 in FIG. 7.

A second method for the moving object identification processing in step S15 will now be described referring to FIGS. 8A to 8F and a flowchart illustrated in FIG. 10.

In step S30, the value indicating the degree of dispersion of the group that is determined as the representative motion vector group in the preceding field and the value indicating the degree of dispersion of each of the plurality of the motion vector groups in the current field are compared to determine whether they correspond to each other.

More specifically, a difference between the value indicating the degree of dispersion of the vector detection areas of the group determined as the representative motion vector group in the preceding field and the value indicating the degree of dispersion of the vector detection areas of each of the plurality of the motion vector groups in the current field is calculated.

According to the present exemplary embodiment, the values indicating the degree of dispersion are compared by calculating the difference between the dispersion values. Then, in step S31, the representative motion vector of the above-described group having the smallest difference is determined as the motion vector of the entire screen (whole image data).

Processes in steps S30 and S31 will be described below in detail. According to the present exemplary embodiment, the states of FIGS. 8A to 8F are similar to those described in the first exemplary embodiment.

According to the processing in step S14, one group out of a plurality of groups in the preceding field is determined as the representative motion vector group (reference group). According to the present exemplary embodiment, a representative motion vector of a group having a greater value that indicates the degree of dispersion with respect to the motion vectors in the vector detection areas obtained in step S12 is determined as the motion vector of the entire screen (whole image data).

According to the present exemplary embodiment, since Z11 is greater than Z12 as illustrated in FIG. 8C, the group 11 in FIG. 8B is determined as the representative motion vector of the preceding field.

In step S30, a difference between Z11, which is the value indicating the degree of dispersion of the vector detection areas in the group 11 in the preceding field, and Z21, which is the value indicating the degree of dispersion of the vector detection areas in the group 21 in the current field, is defined as ΔZ [21].

Further, a difference between Z11 and Z22, which is the value indicating the degree of dispersion of the vector detection areas in the group 22 in the current field, is defined as ΔZ[22]. Calculating formulae for obtaining ΔZ[21] and ΔZ[22] are the following formulae (6) and (7).

$$\Delta Z[1] = |Z21 - Z11| \tag{6}$$

$$\Delta Z[2] = |Z22 - Z12| \tag{7}$$

In NTSC format, since the time between fields is only 1/60 second, the value indicating the degree of dispersion is not likely to change greatly between the preceding and the current fields.

Thus, out of a plurality of groups in the current field, a group having a value indicating the degree of dispersion that is closer to the value indicating the degree of dispersion of the group that does not include a moving object in the preceding field, is not likely to include the moving object.

Further, a difference between the value indicating the degree of dispersion of the group having the representative motion vector in the preceding field and the value indicating the degree of dispersion of a plurality of motion vector groups in the current field is calculated.

At that time, by determining a group having the smallest difference as the group having the motion vector of the entire screen, the vector detection area that does not include the moving object can be determined more accurately.

As can be seen from FIGS. 8C and 8F in step S31, ΔZ[21] is smaller than ΔZ[22]. Thus, the group 21 is determined as the group that does not include the moving object in the current field, and further the group 11 is determined as the group that does not include the moving object in the preceding field.

According to the processes in steps S30 and S31, a difference between the value indicating the degree of dispersion of the group that is not determined as the representative motion vector group in the preceding field and the value indicating the degree of dispersion of each group detected in the current field is calculated. Then the group having the smallest difference in the current field is determined.

This group having the smallest difference is excluded when the group of the motion vector of the entire screen is determined, and the remaining representative motion vector of the groups can be determined as the motion vector of the entire screen. In this way, a similar effect can also be achieved.

Further, according to processes insteps S30 and S31, the group having a smaller value indicating the degree of dispersion of the vector detection areas obtained in step S12 can be determined as the group including the moving object, and further as the group of the representative motion vector.

In that case, the value indicating the degree of dispersion of the group that is not determined as the representative motion vector group in the preceding field and the value indicating the degree of dispersion of each of the plurality of groups in the current field are compared to determine a group in the current field having the smallest difference with the group in the preceding field. Then the determined group in the current field is determined as the group including the moving object.

When a difference between the value indicating degree of dispersion of the group determined as the representative motion vector in the preceding field and the value indicating degree of dispersion of the group not determined as the representative motion vector in the preceding field, and each of the values indicating degree of dispersion of a plurality of motion vector groups in the current field are compared, a group in the current field having the smallest difference of the value indicating degree of dispersion of the group is determined as the group corresponding to the group that is determined as a representative motion vector in the preceding field. Thereby, correspondence between a group determined in the preceding field and a group in the current field is determined. Therefore, the areas located in different fields can be related with each other through time sequence. As a result, even when a moving object is becoming larger gradually, the possibility of determining the area erroneously and changing the target groups for correcting camera shake erroneously can be reduced. By using an imaging apparatus that includes the motion vector detection device according to the present exemplary embodiment and by applying camera shake correction to the group that is determined as the group that does not include the moving object, the screen is not drawn by the moving object.

Further, by applying the camera shake correction to the group that is determined as the group including the moving object, tracking of the moving object becomes possible.

A third method for the moving object identification processing in step S15 will now be described referring to FIGS. 11A to 11F and a flowchart illustrated in FIG. 12.

In the first and the second exemplary embodiments, the groups in the preceding and the current fields are determined by grouping the vector detection areas and then calculating the geometric center coordinates or the dispersion values of the groups.

However, as is the case illustrated in FIG. 11D, if the object is in the central portion of the screen, a plurality of groups may have the same geometric center coordinates or the geometric center coordinates may be very close to each other. Thus, according to the present exemplary embodiment, a case where a plurality of groups have the same geometric center coordinates or have geometric center coordinates that are very close to each other will be described as an example.

According to the present exemplary embodiment, the screen of the preceding field at time (t3−Δt) is illustrated in FIG. 11A. After Δt second, the screen is changed to that illustrated in FIG. 11D (current field at time t3).

The geometric center coordinates of each motion vector group in the preceding field are as illustrated in FIG. 11B. Further, the geometric center coordinates of each motion vector group in the current field are as illustrated in FIG. 11E.

A relation between a magnitude of a motion vector of each motion vector group in the preceding field and a value indicating the degree of dispersion of the vector detection areas is as illustrated in FIG. 11C.

Further, a relation between the magnitudes of the motion vectors of the motion vector groups in the current field and values indicating the degree of dispersion is as illustrated in FIG. 11F.

Processes in steps S40 and S41 will now be described in detail. According to the process in step S14, one group out of a plurality of groups in the preceding field is determined as the representative motion vector group (reference group).

According to the present exemplary embodiment, a representative motion vector of a group having a greater value indicating the degree of dispersion with respect to the motion vectors in the vector detection areas obtained in step S12 is determined as the motion vector of the entire screen (whole image data). According to the present exemplary embodiment, since Z31 is greater than Z32 as illustrated in FIG. 11C, a group 31 in FIG. 11B is determined as the representative motion vector of the preceding field.

In step S40, the group area that is determined as the representative motion vector group area in the preceding field and the plurality of the motion vector group areas in the current field are compared to determine whether they correspond to each other.

More specifically, the geometric center coordinates of the representative motion vector group in the preceding field and the geometric center coordinates of each of the plurality of the motion vector groups in the current field are compared. A difference between the geometric center coordinates is calculated for the comparison. Since this process is the same as the process described above referring to step S20, its description will be omitted.

Next, since the moving object is at the central portion of the screen in FIG. 11D, geometric center coordinates G42 of a group 42 has the same or close geometric center coordinates as geometric center coordinates G41 of a group 41.

Thus, the difference between geometric center coordinates G31 of the group 31, which is determined as the representative motion vector group in the preceding field, and the geometric center coordinates G41 of the group 41, and also the difference between G31 and the geometric center coordinates G42 of the group 42 will be zero or a very small value.

If there is no difference between the geometric center coordinates, it is difficult to identify the group that does not include a moving object. Further, if the difference of the geometric center coordinates is small, the group that includes a moving object may be incorrectly identified.

Next, the process in step S41 will be described. In step S41, a difference between the geometric center coordinates of the representative motion vector group in the preceding field obtained in step S40 and the geometric center coordinates of each group in the current field is determined whether it is greater than or equal to a predetermined value.

A predetermined value (G_DIFF) is defined, for example, as half the distance between the centers of two neighboring motion vector detection areas of the screen coordinates illustrated in FIG. 6A. Thus, G_DIFF is expressed as $(X_{i+1}-X_i)/2$.

According to the present exemplary embodiment, in step S41, if a difference between a difference between the geometric center coordinates G31 of the representative motion vector group in the preceding field and the geometric center coordinates G41 of the group 41 and a difference between the coordinates G42 of the group 42 and the coordinates G31 illustrated in FIG. 11E is determined to be smaller than G_DIFF (NO in step S41), then the process proceeds to step S42. In other words, if ||G41−G31|−|G42−G31|| is determined to be smaller than G_DIFF, then the process proceeds to step S42.

In step S42, the value indicating the degree of dispersion of the vector detection areas of the representative motion vector group in the preceding field and the value indicating the degree of dispersion of the vector detection areas of each of the plurality of the motion vector groups in the current field are compared.

According to the present exemplary embodiment, the values indicating the degree of dispersion are compared by calculating the difference between the dispersion values. In step S43, the representative motion vector of the above-described group having the smallest difference is determined as the motion vector of the entire screen (whole image data). Processes in steps S42 and S43 according to the present exemplary embodiment will be described below.

In step S42, a difference between Z31, which is a value indicating the degree of dispersion of the vector detection areas in the group 31, and Z41, which is a value indicating the degree of dispersion of the vector detection areas in the group 41 in the current field, is defined as $\Delta Z[41]$.

Further, a difference between Z31 and Z42, which is a value indicating the degree of dispersion of the vector detection areas in the group 42 in the current field, is defined as $\Delta Z[42]$.

Then, $\Delta Z[41]$ and $\Delta Z[42]$ are obtained. Calculating formulae for obtaining $\Delta Z[41]$ and $\Delta Z[42]$ are the following formulae (8) and (9).

$$\Delta Z[41]=|Z41-Z31| \quad (8)$$

$$\Delta Z[42]=|Z42-Z31| \quad (9)$$

Next, processing in step S43 will be described. According to the calculation result in step S42, in some cases the geometric center coordinates G41 and G42 of the respective groups 41 and 42 match as illustrated in FIG. 11E. In this case also, the group 41, which is the group having the smallest $\Delta Z[41]$ and $\Delta Z[42]$, which are the values indicating the difference between the degree of dispersion of the vector detection areas, is determined as the group not including the same moving object as that in the group 31.

In step S41, if a difference between, a difference between the geometric center coordinates G31 of the representative motion vector group in the preceding field and the geometric center coordinates G41 of the groups 41, and a difference between coordinates G42 of the group 42 and the coordinates G31 illustrated in FIG. 11E is determined to be greater than or equal to G_DIFF (YES in step S41), then the process proceeds to step S44. In other words, if ||G41−G31|−|G42−G31|| is determined to be greater than or equal to G_DIFF, then the process proceeds to step S44.

According to the process in step S44, groups that do not include the moving object are determined. The process in step S44 is similar to that in step S21. According to the process, the group 41 is determined as the group that does not include the moving object in the current field. Thus, the groups 41 and the group 31 are determined as the groups that do not include the moving object.

According to the processes in steps S40 to S43, at first, a difference between the geometric center coordinates of a group that is not determined as the representative motion vector group in the preceding field and the geometric center coordinates of each of the plurality of the motion vector groups in the current field is determined.

If the difference is smaller than or equal to the predetermined value, then the group having the smallest difference regarding the value indicating the degree of dispersion of the group not determined as the representative motion vector group in the preceding field and the value indicating the degree of dispersion of each of the plurality of groups in the current field is excluded from the candidate motion vector group of the entire screen.

Then, the remaining representative motion vector of the groups can be determined as the motion vector of the entire screen. In this way, a similar effect can be obtained.

Further, according to the processes in steps S40 to S43, the group having a smaller value in the geometric center coordinates obtained in step S12 can be determined as the group including the moving object. Then, the motion vector of the determined group can be determined as the representative motion vector in the preceding field.

In this case, a difference between the geometric center coordinates of the group that is not determined as the representative motion vector group in the preceding field and the geometric center coordinates of each of the plurality of the motion vector groups in the current field is determined.

If the difference is smaller than or equal to the predetermined value, then the group having the smallest difference regarding the value indicating the degree of dispersion of the group not determined as the representative motion vector group in the preceding field and the value indicating the degree of dispersion of each of the plurality of groups in the current field is determined as the group of the moving object. In this way, a similar effect can be obtained.

When a difference between the geometric center coordinates of the group determined as the representative motion vector in the preceding field and each of the geometric center coordinates of a plurality of motion vector groups in the current field are compared, and if the difference is within a predetermined value, then values indicating a degree of dispersion are compared. When a difference between the value indicating degree of dispersion of the group determined as the representative motion vector in the preceding field and the value indicating degree of dispersion of the group not determined as the representative motion vector in the preceding field, and each of the values indicating degree of dispersion of a plurality of motion vector groups in the current field are compared, a group in the current field having the smallest difference of the value indicating degree of dispersion of the group is determined as the group corresponding to the group that is determined as a representative motion vector in the preceding field. Thereby, correspondence between a group determined in the preceding field and a group in the current field is determined. Therefore, the areas located in different fields can be related with each other through time sequence. As a result, even when amounts of dispersion of a background and a moving object are similar or a moving object is becoming larger gradually, the possibility of determining the corresponding area erroneously and changing the target groups for correcting camera shake erroneously can be reduced. By using an imaging apparatus that includes the motion vector detection device according to the present exemplary embodiment and by applying camera shake correction to the group that is determined as the group that does not include the moving object, the screen is not drawn by the moving object.

Further, by applying the camera shake correction to the group that is determined as the group including the moving object, tracking of the moving object becomes possible.

Figure 14:
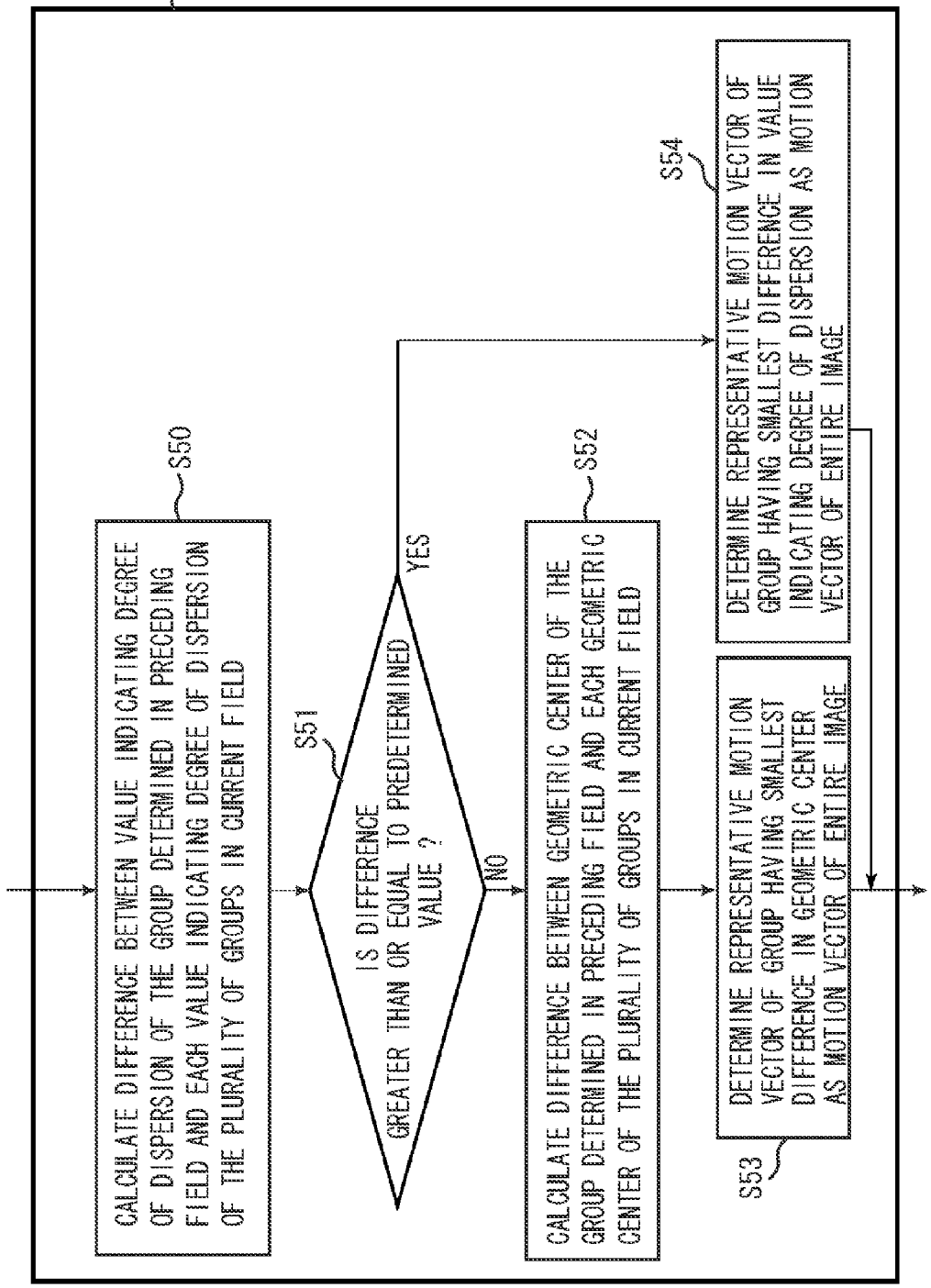
FIG. 14 is a flowchart illustrating a fourth method for moving object identification processing in step S15.
Figure 15:
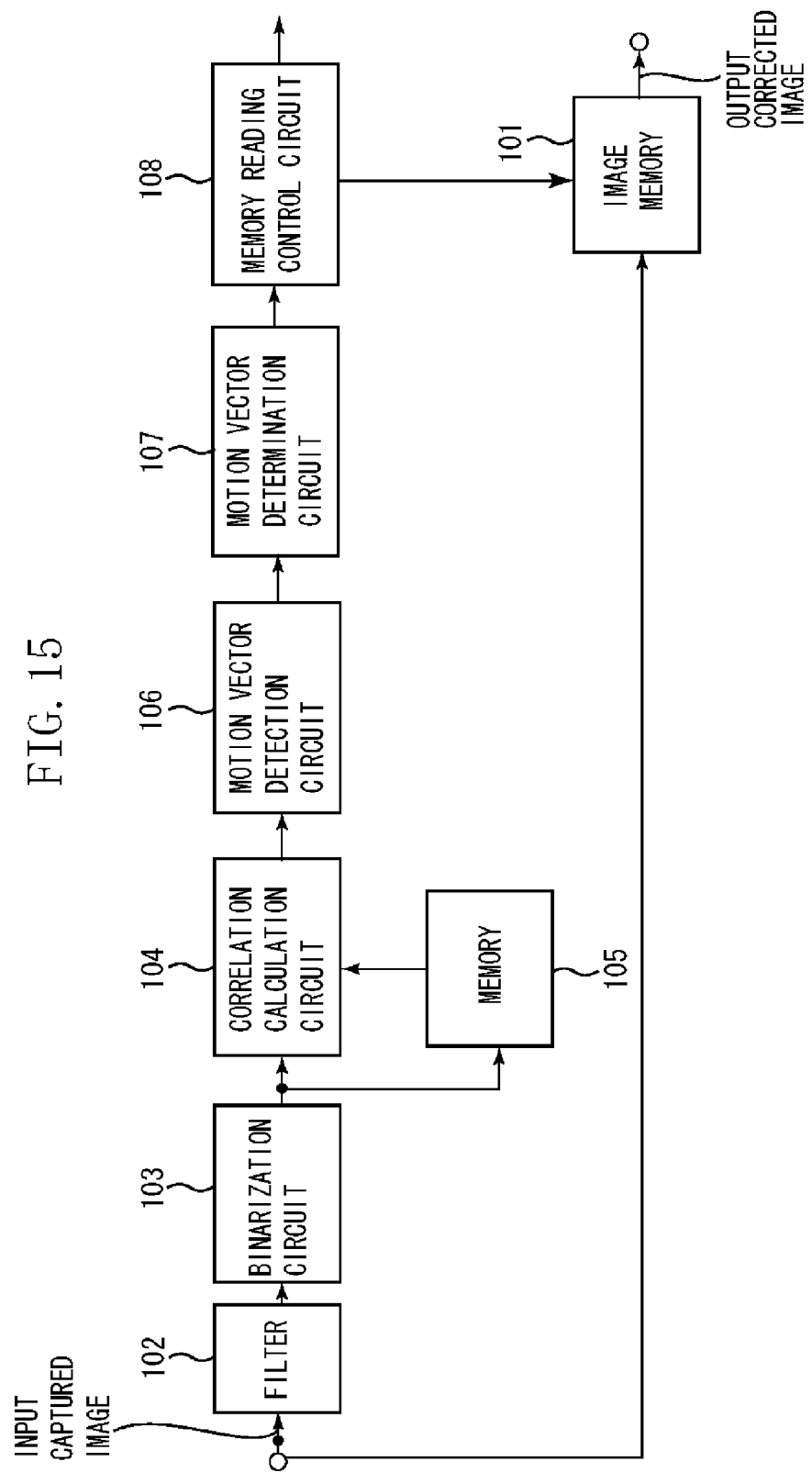
FIG. 15 is a schematic block diagram of an imaging apparatus that prevents blurs using a conventional image processing method.

A fourth method for the moving object identification processing in step S15 will now be described referring to FIGS. 13A to 13F and the flowchart illustrated in FIG. 14.

In the first and the second exemplary embodiments, the groups in the preceding and the current fields are determined by grouping the vector detection areas and then calculating the geometric center coordinates or the dispersion values of the groups.

However, as illustrated in FIG. 13D, if the object is in one side of the screen, a plurality of groups may have the same value or very close values indicating the degree of dispersion.

Thus, according to the present exemplary embodiment, a case where a plurality of groups have the same value or very close values indicating the degree of dispersion will be considered.

According to the present exemplary embodiment, the screen of the preceding field at time (t4−Δt) is illustrated in FIG. 13A. After Δt second, the screen is changed to that illustrated in FIG. 13D (current field at time t4).

The geometric center coordinates of each motion vector group in the preceding field are as illustrated in FIG. 13B. Further, the geometric center coordinates of each motion vector group in the current field are as illustrated in FIG. 13E.

A relation between a magnitude of a motion vector of each motion vector group in the preceding field and a value indicating the degree of dispersion of the vector detection areas is as illustrated in FIG. 13C.

Further, a relation between the magnitudes of the motion vectors of the motion vector groups in the current field and values indicating the degree of dispersion is as illustrated in FIG. 13F.

Processes in steps S50 and S51 will now be described in detail. According to the process in step S14, one group out of a plurality of groups in the preceding field is determined as the representative motion vector group (reference group).

According to the present exemplary embodiment, a representative motion vector of a group having a greater value indicating the degree of dispersion with respect to the motion vectors in the vector detection areas obtained in step S12 is determined as the motion vector of the entire screen (whole image data).

Thus, according to the present exemplary embodiment, since Z51 is greater than Z52 as illustrated in FIG. 13C, a group 51 in FIG. 13B is determined as the representative motion vector of the preceding field.

In step S50, the group area that is determined as the representative motion vector group area in the preceding field and the plurality of the motion vector group areas in the current field are compared to determine whether they correspond with each other.

More particularly, the value indicating the degree of dispersion of the representative motion vector group in the preceding field and the value indicating the degree of dispersion of each of the plurality of the motion vector groups in the current field are compared.

A difference between the values indicating the degree of dispersion is calculated for the comparison. Since this process is the same as the process described in step S30, its description will be omitted.

Next, according to the present exemplary embodiment, since the moving object occupies the left half side of the screen of the current field in FIG. 13D, Z61 and Z62 that are the values indicating the degree of dispersion of the vector detection areas of groups 61 and 62 have the same or close values.

Thus, the difference between Z51, which is a value indicating the degree of dispersion of the vector detection area of a group 51 determined as the representative motion vector group in the preceding field, and Z61, which is a value indicating the degree of dispersion of the vector detection area of a group 61, and also the difference between Z51 and Z62, which is a value indicating the degree of dispersion of the vector detection area of a group 62, will be zero or a very small value.

If there is no difference between the values indicating the degree of dispersion of the vector detection areas, it is difficult to identify the group that does not include a moving object. Further, if the difference of the value indicating the degree of dispersion of the vector detection areas is small, the group that includes a moving object may be incorrectly identified.

In step S51, a difference between the value indicating the degree of dispersion of the representative motion vector group in the preceding field obtained in step S50 and the value indicating the degree of dispersion of each group in the current field is determined whether it is greater than or equal to a predetermined value.

The predetermined value (Z_DIFF) is defined, for example, as the square of the distance between the centers of two neighboring motion vector detection areas of the screen coordinates illustrated in FIG. 6A. Thus, Z_DIFF is expressed as $(X_{i+1}-X_i)^2$.

According to the present exemplary embodiment, in step S51, if a difference between the value indicating the degree of dispersion Z51 of the representative motion vector group in the preceding field and the value indicating the degree of dispersion Z61 of the group 61, and a difference between Z51 and Z62 of the group 62 illustrated in FIG. 13E is determined to be smaller than or equal to Z_DIFF (NO in step S51), then the process proceeds to step S52. In other words, if ||Z61−Z51|−|Z62−Z51|| is determined to be smaller than or equal to Z_DIFF, then the process proceeds to step S52.

In step S52, the geometric center coordinates of the vector detection areas of the representative motion vector group in the preceding field and the geometric center coordinates of the vector detection areas of each of the plurality of the motion vector groups in the current field are compared.

According to the present exemplary embodiment, the geometric center coordinates are compared by calculating the difference between the geometric center coordinates. In step S53, the representative motion vector of the above-described group having the smallest difference is determined as the motion vector of the entire screen (whole image data). Processes in steps S52 and S53 according to the present exemplary embodiment will be described below.

In step S52, a difference between G51, which is geometric center coordinates of the vector detection area in the group 51, and Z61, which is geometric center coordinates of the vector detection area in the group 61 in the current field, is defined as ΔG[61].

Further, a difference between G51 and geometric center coordinates G62 of the group 62 in the current field is defined as ΔG[62].

Then, Δ[61] and ΔG[62] are obtained. Calculating formulae for obtaining ΔG[61] and ΔG[62] are the following formulae (10) and (11).

$$\Delta G[61] = |G61 - G51| \quad (10)$$

$$\Delta G[62] = |G62 - G51| \quad (11)$$

Next, processing in step S53 will be described. According to the calculation result obtained in step S52, in some cases the values indicating the degree of dispersion Z61 and Z62 of the vector detection areas in groups 61 and 62 match as illustrated in FIG. 13E.

In this case also, the group 61, which is the group having the smallest ΔG [61] and ΔG [62], which are the difference between the geometric center coordinates, is determined as the group not including the moving object as is the group 51.

According to the processes in steps S50 to S53, at first, a difference between the value indicating the degree of dispersion of a group that is not determined as the representative motion vector group in the preceding field and the value indicating the degree of dispersion of each of the plurality of the motion vector groups in the current field is determined.

If the difference is smaller than or equal to the predetermined value, then the group having the smallest difference regarding the geometric center coordinates of the group not determined as the representative motion vector group in the preceding field and the geometric center coordinates of each of the plurality of the motion vector groups in the current field is excluded from the candidate motion vector group of the entire screen.

Then, the representative motion vector of the remaining group can be determined as the motion vector of the entire screen. In this way, a similar effect can be obtained.

Further, according to the processes in steps S50 to S53, the group having a smaller difference in the values indicating the degree of dispersion of the vector detection areas obtained in step S12 can be determined as the group including the moving object. Then, the motion vector of the determined group can be determined as the representative motion vector in the preceding field.

In this case, a difference between the value indicating the degree of dispersion of the vector detection areas in the group that is not determined as the representative motion vector group in the preceding field and the value indicating the degree of dispersion of the vector detection areas in each of the plurality of the motion vector groups in the current field is determined.

If the difference is smaller than or equal to the predetermined value, then the group having the smallest difference regarding the geometric center coordinates of the group not determined as the representative motion vector group in the preceding field and the geometric center coordinates of each of the plurality of groups in the current field is determined as the group of the moving object. In this way, a similar effect can be obtained.

By using an imaging apparatus that includes the motion vector detection device according to the present exemplary embodiment and by applying camera the shake correction to the group determined as the group that does not include the moving object, the screen is not drawn by the moving object.

Further, by applying the camera shake correction to the group that is determined as the group including the moving object, tracking of the moving object becomes possible.

As another exemplary embodiment of step S14, a case where the moving object is as large as half the size of the screen will be described.

Regarding the process in step S14, one out of a plurality of groups is determined as a representative motion vector group (reference group). According to the exemplary embodiments 1 to 4, the group is determined using the values indicating the degree of dispersion of the vector detection areas.

However, if a large moving object exists in the screen such as the bus illustrated in FIG. 13, it is not always appropriate to determine the representative motion vector using the group having the largest value indicating the degree of dispersion of the vector detection areas as the background area.

If the contrast of the background is low, a vector is not easily detected by the motion vector detection circuit 31. Further, in some cases, possibility of an error vector occurs. The possibility of the error vector is increased if the number of vector detection areas that configure the group is small.

when a difference between the value indicating degree of dispersion of the group determined as the representative motion vector in the preceding field and each of the values indicating degree of dispersion of a plurality of motion vector groups in the current field are compared, and if the difference is within a predetermined value, geometric center coordinates are compared. When a difference between the geometric center coordinates of the group determined as the representative motion vector in the preceding field and the geometric center coordinates of the group not determined as the representative motion vector in the preceding field, and each of the geometric center coordinates of a plurality of motion vector groups in the current field are compared, a group in the current field having the smallest difference of the geometric center coordinates of the group is determined as the group corresponding to the group that is determined as a representative motion vector in the preceding field. Thereby, correspondence between a group determined in the preceding field and a group in the current field is determined. Therefore, the areas located in different fields can be related with each other through time sequence. As a result, even when amounts of dispersion of a background and a moving object are similar or a moving object is becoming larger gradually, the possibility of determining the corresponding area erroneously and changing the target groups for correcting camera shake erroneously can be reduced. By using an imaging apparatus that includes the motion vector detection device according to the present exemplary embodiment and by applying camera shake correction to the group that is determined as the group that does not include the moving object, the screen is not drawn by the moving object.

Regarding the setting of the reference group in step S14, the object and the background can be determined using face detection function, color information, and distance information.

According to the first to the fifth exemplary embodiments, the group areas in the preceding field and the current field are compared by using the geometric center coordinates of the vector detection areas or the value indicating the degree of dispersion of the vector areas.

However, the group areas of the current and the preceding fields can be compared by using degree of color correlation between the fields. Further, a number of areas that is in the same group area in the current and the preceding fields can be compared.

Aspects of the present invention can be achieved by supplying a computer-readable storage medium, in which one or more of computer-executable instructions and software program code configured to realize a function according to the above-described exemplary embodiments is stored, to a computer or an apparatus, and reading out one or more of the computer-executable instructions and program code stored in the computer-readable storage medium by a control unit of the computer or the apparatus. The control unit of the computer or the apparatus is, for example, a system control unit, a central processing unit (CPU), or a micro processing unit (MPU).

In this case, the program code itself read out from the storage medium realizes the functions described in the above-described embodiments and the storage medium which stores the program code that realizes the functions of the above-described exemplary embodiments constitutes the present invention.

A storage medium for storing the program includes a flexible disk, a hard disk, an optical disk, a magneto-optical disk, a compact disc read-only memory (CD-ROM), a compact disc-recordable (CD-R), a digital-versatile-disc read-only memory (DVD-ROM), a magnetic tape, a non-volatile memory card, and a ROM.

Further, although the first to the fifth exemplary embodiments are described referring to one moving object in the screen, however, the method of the present invention can also be applied to a case where two or more moving objects are in the screen.

By incorporating the image processing apparatus in an image stabilization mechanism of a video camera or a camera, if a moving object is in the screen when the image is captured, the camera shake can be efficiently corrected since the moving object can be separated from the background using the motion vector.

Further, by applying the camera shake correction to the background, image stabilization function can be activated. Furthermore, by applying the camera shake correction to the object, not only the blur of the object can be prevented but also tracking function can be activated. The video camera and the camera are not limited to those intended for home use or professional use, and the present invention can be applied to a video camera or a camera for special application such as a security camera or a camera for medical use.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-248070 filed Sep. 26, 2008, which is hereby incorporated by reference herein in its entirety.

What is claimed is:

1. An image processing apparatus comprising:
a motion vector detecting unit configured to detect, for each field image of a video signal, a motion vector in each of a plurality of vector detection areas within the field image;
a group area determining unit configured to determine, for each field image, one or more group areas obtained by grouping the motion vector detection areas based on motion vectors detected by the motion vector detecting unit;
a geometric center calculation unit configured to obtain, for each group area, the geometric center of the group area;
a dispersion calculation unit configured to calculate a difference in dispersion values of coordinates of the group areas in fields that are consecutive in terms of time; and
a determination unit configured to determine group areas that correspond to each other in fields that are in consecutive relation in terms of time by comparing the geometric centers of the group areas obtained for each field image in consecutive relation,
wherein the determination unit determines, if a difference between geometric centers of the group areas is smaller than a predetermined value, the group areas that correspond to each other in fields that are in consecutive relation in terms of time by determining the smallest difference in dispersion values of the group areas obtained for each field in consecutive relation.

2. An image processing apparatus according to claim 1,
wherein the determination unit determines,
as a representative motion vector, a motion vector of the group area for which the difference calculated by the calculation unit is smallest, and
wherein the determination unit determines, if a difference between geometric centers of the group areas is smaller than a predetermined value, a motion vector of the group area for which a difference calculated by the dispersion calculation unit is smallest, as the representative motion vector.

3. An image processing apparatus according to claim 1, wherein the determination unit classifies the motion vector of each vector detection area on a frequency distribution that sets magnitude of the motion vector as a class, and sets one or more of the group areas based on frequency and distance between the classes.

4. An imaging apparatus comprising the image processing apparatus according to claim 1, further comprising shake correction unit configured to correct image blurring based on an output of the image processing apparatus.

5. An image processing apparatus comprising:
a motion vector detecting unit configured to detect, for each field image of a video signal, a motion vector in each of a plurality of vector detection areas within the field image;
a group area determining unit configured to determine, for each field image, one or more group areas obtained by grouping the motion vector detection areas based on motion vectors detected by the motion vector detecting unit;
a dispersion calculation unit configured to obtain, for each field group area, a dispersion value of coordinates of the group area;
a geometric center calculation unit configured to calculate a difference in the geometric centers of the group areas in fields that are consecutive in terms of time;
a determination unit configured to determine group areas that correspond to each other in fields that are in consecutive relation in terms of time by comparing dispersion values of coordinates of the group areas obtained for each field in consecutive relation,
wherein the determination unit determines, if a difference between dispersion values of the group areas is smaller than a predetermined value, the group areas that correspond to each other in fields that are in consecutive relation in terms of time by determining the smallest difference in geometric centers of the group areas obtained for each field in consecutive relation.

6. An image processing apparatus according to claim 5,
wherein the determination unit determines, as a representative motion vector, a motion vector of the group area for which a difference calculated by the calculation unit is smallest,
wherein the determination unit determines, if a difference between geometric centers of the group areas is smaller than a predetermined value, a motion vector of the group area for which a difference calculated by the geometric center calculation unit is smallest, as the representative motion vector.

7. An image processing apparatus according to claim 5, wherein the determination unit classifies the motion vector of each vector detection area on a frequency distribution that sets magnitude of the motion vector as a class, and sets one or more of the group areas based on frequency and distance between the classes.

8. An imaging apparatus comprising the image processing apparatus according to claim 5, further comprising shake correction unit configured to correct image blurring based on an output of the image processing apparatus.

9. An image processing method comprising:
detecting, for each field image of a video signal, a motion vector in each of a plurality of vector detection areas within the field image;
determining, for each field image, one or more group areas obtained by grouping the motion vector detection areas based on motion vectors detected by the motion vector;
calculating, for each group area, the geometric center of the group area;
calculating a difference in dispersion values of coordinates of the group areas in fields that are consecutive in terms of time; and
determining group areas that correspond to each other in fields that are in consecutive relation in terms of time by comparing the geometric centers of the group areas obtained for each field image in consecutive relation,
wherein the group areas are determined that, if a difference between geometric centers of the group areas is smaller than a predetermined value, correspond to each other in fields that are in consecutive relation in terms of time by determining the smallest difference in dispersion values of the group areas obtained for each field in consecutive relation.

10. An image processing method comprising:
detecting, for each field image of a video signal, a motion vector in each of a plurality of vector detection areas within the field image;
determining, for each field image, one or more groups areas obtained by grouping the motion vectors detection areas based on detected motion vector;
calculating, for each group area, a dispersion value of coordinates of the group area;
calculating a difference in the geometric centers of the group areas in fields that are consecutive in terms of time;
determining group areas that correspond to each other in fields that are in consecutive relation in terms of time by comparing dispersion values of coordinates of the group areas obtained for each field in consecutive relation,
wherein the group areas are determined that, if a difference between dispersion values of the group areas is smaller than a predetermined value, correspond to each other in fields that are in consecutive relation in terms of time by determining the smallest difference in geometric centers of the croup areas obtained for each field in consecutive relation.

11. A non-transitory computer-readable storage medium storing a computer-executable program that, when executed on an image processing apparatus, causes the image processing apparatus to perform a method according to claim 9.

12. A non-transitory computer-readable storage medium storing a program that, when executed on an image processing apparatus, causes the image processing apparatus to perform a method according to claim 10.

13. An image processing method according to claim 9,
wherein the determination unit determines, as a representative motion vector, a motion vector of the group area for which the difference calculated by the calculation unit is smallest, and
wherein the determination unit determines, if a difference between geometric centers of the group areas is smaller than a predetermined value, a motion vector of the group area for which a difference calculated by the dispersion calculation unit is smallest, as the representative motion vector.

14. An image processing method according to claim 9, wherein the motion vector of each vector detection area is classified on a frequency distribution that sets magnitude of the motion vector as a class, and sets one or more of the group areas based on frequency and distance between the classes.

15. An image processing method according to claim 9, further comprising, correcting image blurring based on the determined group areas.

16. An image processing method according to claim 10,
wherein a motion vector of the group area for which a difference calculated by the calculation unit is smallest is determined as a representative motion vector,
wherein, if a difference between geometric centers of the group areas is smaller than a predetermined value, a motion vector of the group area for which a difference calculated by the geometric center calculation unit is smallest is determined as the representative motion vector.

17. An image processing method according to claim 10, wherein the motion vector of each vector detection area is classified on a frequency distribution that sets magnitude of the motion vector as a class, and sets one or more of the group areas based on frequency and distance between the classes.

18. An image processing method according to claim 10, further comprising, correcting image blurring based on the determined group areas.

\* \* \* \* \*